(12) United States Patent
Park

(10) Patent No.: US 9,936,012 B2
(45) Date of Patent: Apr. 3, 2018

(54) USER TERMINAL DEVICE, SNS PROVIDING SERVER, AND CONTENTS PROVIDING METHOD THEREOF

(71) Applicant: Samsung Electronics Co., Ltd., Suwon-si, Gyeonggi-do (KR)

(72) Inventor: Sung-jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 14/434,996

(22) PCT Filed: Oct. 10, 2013

(86) PCT No.: PCT/KR2013/009070
§ 371 (c)(1),
(2) Date: Apr. 10, 2015

(87) PCT Pub. No.: WO2014/058250
PCT Pub. Date: Apr. 17, 2014

(65) Prior Publication Data
US 2015/0304413 A1 Oct. 22, 2015

(30) Foreign Application Priority Data
Oct. 10, 2012 (KR) .......... 10-2012-0112644

(51) Int. Cl.
*G06F 15/16* (2006.01)
*H04L 29/08* (2006.01)
(Continued)

(52) U.S. Cl.
CPC ....... *H04L 67/1095* (2013.01); *G06Q 10/101* (2013.01); *G06Q 50/01* (2013.01); *H04L 65/403* (2013.01)

(58) Field of Classification Search
CPC ...... G06Q 10/10; G06Q 10/101; G06Q 50/01; G06Q 30/0241; H04L 12/1827; H04L 65/403; H04L 65/4069; H04L 67/1095
(Continued)

(56) References Cited

U.S. PATENT DOCUMENTS 9,246,613 B2 * 1/2016 McKee ................ G06Q 10/105
2006/0002681 A1 * 1/2006 Spilo ........................ H04N 5/76
386/220

(Continued)

FOREIGN PATENT DOCUMENTS

KR 10-2004-0079386 A 9/2004
KR 10-0664206 B1 12/2006
(Continued)

OTHER PUBLICATIONS

Segui et al.; An RTP/RTCP based approach for multimedia group and inter-stream synchronization; Multimed Tools Appl (2008) 40:285-319; DOI 10.1007/s11042-008-0208-1; Springer Science + Business Media, LLC 2008; Jun. 25, 2008.

*Primary Examiner* — Ruolei Zong
(74) *Attorney, Agent, or Firm* — Jefferson IP Law, LLP

(57) ABSTRACT

A user terminal is provided. The user terminal includes a communicator configured to perform communication with a Social Network Service (SNS) providing server, an application driver configured to drive an SNS providing application to perform communication with another user, and a controller configured to, when a predetermined event occurs while the SNS providing application is operated, control to transmit information regarding reproduction of contents which are reproduced through a content play application so as to share information regarding reproduction of the contents with the other user.

15 Claims, 21 Drawing Sheets

(51) Int. Cl.
*H04L 29/06* (2006.01)
*G06Q 10/10* (2012.01)
*G06Q 50/00* (2012.01)

(58) Field of Classification Search
USPC .......................................................... 709/204
See application file for complete search history.

(56) References Cited

U.S. PATENT DOCUMENTS

| | | | |
|---|---|---|---|
| 2008/0037953 A1* | 2/2008 | Kawamura | H04N 5/783 386/343 |
| 2008/0177822 A1* | 7/2008 | Yoneda | H04L 12/282 709/202 |
| 2009/0215416 A1 | 8/2009 | Devore | |
| 2009/0293079 A1 | 11/2009 | McKee et al. | |
| 2011/0238759 A1 | 9/2011 | Spataro et al. | |
| 2012/0072961 A1* | 3/2012 | Marignan | H04N 7/17318 725/109 |
| 2012/0144423 A1 | 6/2012 | Kim et al. | |
| 2012/0303834 A1* | 11/2012 | Adam | H04L 65/4084 709/231 |
| 2013/0031192 A1* | 1/2013 | Caspi | H04L 65/1069 709/206 |
| 2013/0133000 A1* | 5/2013 | Kelley | H04N 21/482 725/37 |
| 2013/0226983 A1* | 8/2013 | Beining | H04N 21/252 709/201 |
| 2013/0242064 A1* | 9/2013 | Herdy | H04N 5/4403 348/51 |

FOREIGN PATENT DOCUMENTS

| | | |
|---|---|---|
| KR | 10-2010-0043931 A | 4/2010 |
| WO | 2011/135300 A2 | 11/2011 |

* cited by examiner

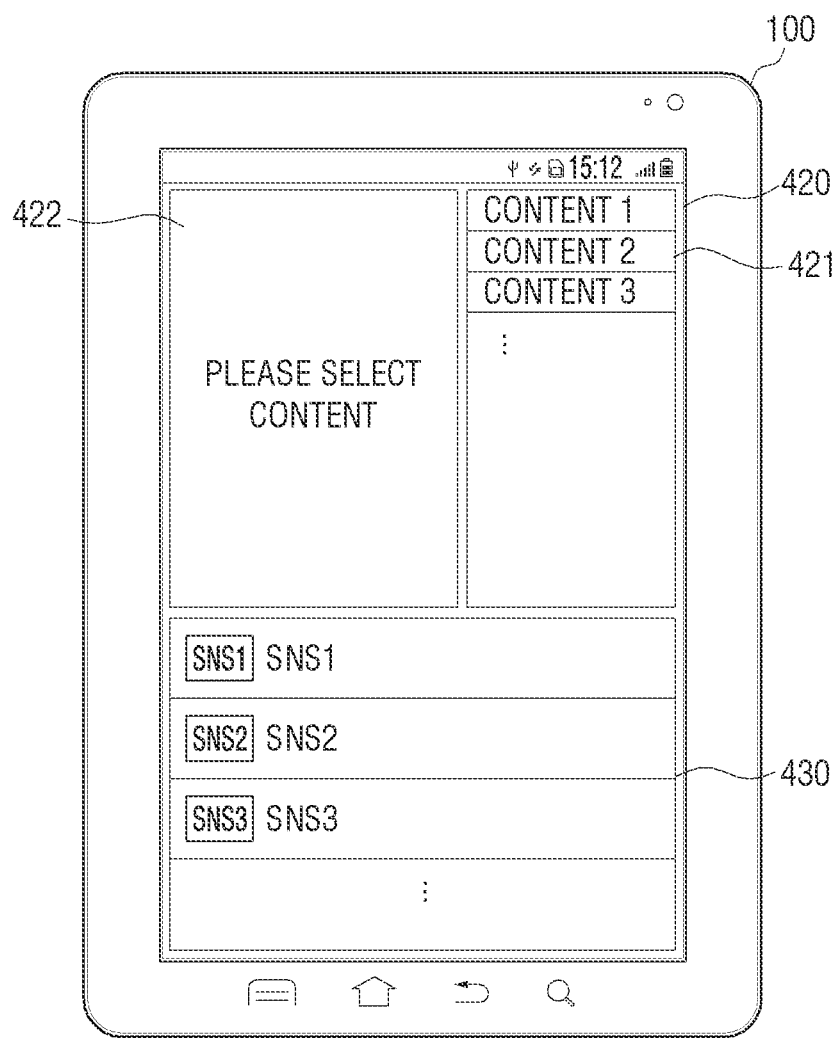

USER TERMINAL DEVICE, SNS PROVIDING SERVER, AND CONTENTS PROVIDING METHOD THEREOF

CROSS-REFERENCE TO RELATED APPLICATION(S)

This application is a U.S. National Stage application under 35 U.S.C. § 371 of an International application filed on Apr. 17, 2014 and assigned application number PCT/KR2013/009070, which claimed the benefit of a Korean patent application filed on Oct. 10, 2012 in the Korean Intellectual Property Office and assigned Serial number 10-2012-0112644, the entire disclosure of which is hereby incorporated by reference.

TECHNICAL FIELD

The present disclosure relates to a user terminal device, a Social Network Service (SNS) providing server, and a contents providing method thereof. More particularly, the present disclosure relates to a user terminal which is capable of providing the same contents to users, an SNS providing server, and a contents providing method thereof.

BACKGROUND

With advances in electronic technology, users are now able to enjoy various contents including broadcasts. These days, as social network services (SNSs) are becoming more popular, users are able to enjoy contents individually. Also, users wish to watch the same contents with others, sharing common interests with each other.

However, there are cases where users may not be able to watch contents with others because of spatial restrictions. For example, it is difficult to watch contents with other users who reside far away.

Accordingly, a method for allowing users to watch the same contents with other users in spite of spatial restrictions is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal which is capable of providing the same contents to users at different locations at the same display time, a Social Network Service (SNS) providing server, and a contents providing method thereof.

In accordance with an aspect of the present disclosure, a user terminal is provided. The user terminal includes a communicator configured to perform communication with an SNS providing server, an application driver configured to drive an SNS providing application to perform communication with another user, and a controller configured to, when a predetermined event occurs while the SNS providing application is operated, control to transmit information regarding reproduction of contents which are reproduced through a content play application and share information regarding reproduction of the contents with the other user.

The predetermined event may include at least one of a point of time when a content play command is input and a point of time when a menu button to share reproduction of the contents is selected.

When the contents are a real-time broadcast, the information regarding reproduction of contents may include information regarding a broadcast channel which is reproduced in the user terminal, and when the contents are streaming contents, the information regarding reproduction of contents may include a network address capable of receiving streaming of the contents and information on a time when the predetermined event occurs.

In accordance with another aspect of the present disclosure, a user terminal is provided. The user terminal includes a communicator configured to perform communication with an SNS providing server, an application driver configured to drive an SNS providing application to perform communication with another user, and a controller configured to, when a predetermined event occurs while the SNS providing application is operated, control to receive information regarding reproduction of contents which the other user is watching from the SNS providing server and reproduce the corresponding contents according to the received information.

The may further include a user interface configured to receive a user command, and the predetermined event may be a point of time when a user command to receive information regarding reproduction of contents that the other user is watching from the SNS providing server is input.

When the contents are a real-time broadcast, the information regarding reproduction of contents may include information regarding a broadcast channel which is reproduced in the user terminal device, and when the contents are streaming contents, the information regarding reproduction of contents may include a network address capable of receiving streaming of the contents and information on a time when the contents are reproduced.

The controller may drive a content play application according to a control command received from the SNS providing server and provide a same broadcast as a real-time broadcast which the other user is watching based on the information regarding the broadcast channel.

The controller may drive a content play application according to a control command received from the SNS providing server and provide streaming contents at a same reproduction time as streaming contents which the other user is watching based on the network address and the time information.

In accordance with another aspect of the present disclosure, an SNS providing server is provided. The SNS providing server includes a communicator configured to perform communication with a first user terminal and a second user terminal, and a controller configured to, while the first and the second user terminals perform communication, receive information regarding reproduction of contents which a first user is watching from the first user terminal and transmit the information to the second user terminal so that the second user shares information regarding reproduction of the contents.

The controller may control to transmit a control command to drive a content play application corresponding to information regarding reproduction of the contents to the second user terminal.

In accordance with another aspect of the present disclosure, a method for providing contents in a user terminal is provided. The method includes driving an SNS providing application to perform communication with another user, and when a predetermined event occurs while the SNS providing application is operated, transmitting information regarding reproduction of contents which are reproduced through a content play application to the SNS providing server.

The predetermined event may include at least one of a point of time when a content play command is input and a point of time when a menu button to share reproduction of the contents is selected.

When the contents are a real-time broadcast, the information regarding reproduction of contents may include information regarding a broadcast channel which is reproduced in the user terminal device, and when the contents are streaming contents, the information regarding reproduction of contents may include a network address capable of receiving streaming of the contents and information on a time when the predetermined event occurs.

In accordance with another aspect of the present disclosure, a method for providing contents in a user terminal is provided. The method includes driving an SNS providing application to perform communication with another user, and when a predetermined event occurs while the SNS providing application is operated, receiving information regarding reproduction of contents which the other user is watching from the SNS providing server, and reproducing the corresponding contents according to the received information.

The predetermined event may be a point of time when a user command to receive information regarding reproduction of contents that the other user is watching from the SNS providing server is input.

When the contents are a real-time broadcast, the information regarding reproduction of contents may include information regarding a broadcast channel which is reproduced in the user terminal, and when the contents are streaming contents, the information regarding reproduction of contents may include a network address capable of receiving streaming of the contents and information on a time when the contents are reproduced.

The reproducing may include driving a content play application according to a control command received from the SNS providing server, and providing a same broadcast as a real-time broadcast that the other user is watching based on the information regarding the broadcast channel.

The reproducing may include driving a content play application according to a control command received from the SNS providing server, and providing streaming contents at a same reproduction time as streaming contents that the other user is watching based on the network address and the time information.

In accordance with another aspect of the present disclosure, a method for providing contents in an SNS providing server which performs communication with a first user terminal and a second user terminal is provided. The method includes, while the first and the second user terminals perform communication, receiving information regarding reproduction of contents that a first user is watching from the first user terminal device, and transmitting information regarding reproduction of the contents to the second user terminal device.

The transmitting may include transmitting a control command to drive a content play application corresponding to information regarding reproduction of the contents to the second user terminal device.

As such, according to various embodiments of the present disclosure, users may watch the same contents from the same time regardless of spatial restrictions. In addition, users may perform communication through SNS while watching the same contents, forming and enjoying common ground.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, 6D, 6E, 6F, 6G, 7A, 7B, 7C, 7D, 7E, and 7F are views provided to explain various screens for contents sharing according to various embodiments of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
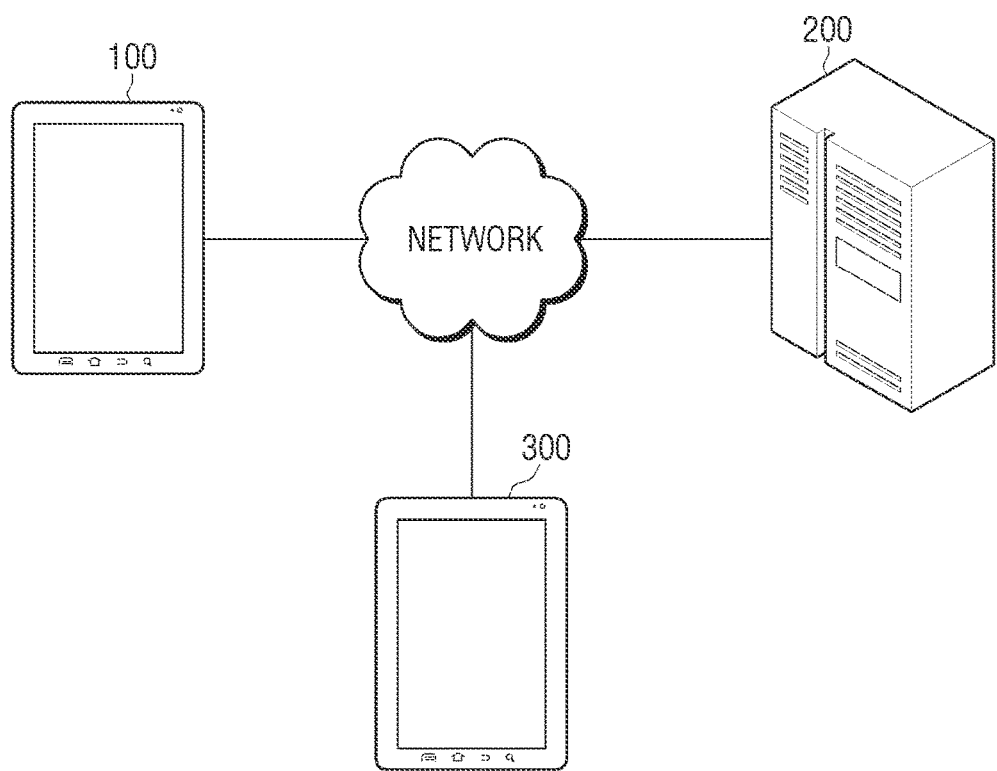
FIG. 1 is a view provided to explain a contents sharing system according to an embodiment of the present disclosure.

FIG. 1 is a view provided to explain a contents sharing system according to an embodiment of the present disclosure.

Referring to FIG. 1, the contents providing system comprises a first user terminal 100, a Social Network Service (SNS) providing server 200, and a second user terminal 300. As illustrated in FIG. 1, the first user terminal 100 and the second user terminal 20 may be realized as a tablet Personal Computer (PC), but are not limited thereto. The first user terminal 100 and the second user terminal 300 may be realized as various apparatuses having a display unit, such as smart phone, smart television, personal digital assistant (PDA), notebook PC, electronic book, electronic album, kiosk, and so on.

A user may communicate with a user of the second user terminal 300 using the first user terminal 100. For example, a user may connect to the SNS providing server 200 using the first user terminal 100, and transmit and receive messages or contents to and from the user of the second user terminal 300 through the SNS providing server 200.

Herein, the SNS providing server 200 refers to a server which is capable of providing an SNS. For example, an SNS refers to a service which allows users to strengthen a connection or create a new relationship on the web with acquaintances such as friends, seniors and juniors, colleagues, and so on so that the users may form a wide social network on the web. Representative SNSs include Twitter, Facebook, Kakao Talk, My People, My Space, Linked In, Bebo, H15?XING, Cyworld, and so on.

Meanwhile, when contents are reproduced during communication with other users via SNS, the first user terminal 100 may share information regarding the contents being reproduced with the second user terminal 300. Herein, the contents may include broadcasts received from a broadcasting station, streaming contents (for example, a moving image) received from a web server (not shown), and so on.

For example, when contents are reproduced during communication with other users via SNS, the first user terminal 100 may transmit information regarding the contents being reproduced to the SNS providing server 200, and receive information regarding the contents being reproduced by accessing the SNS providing server 200.

Herein, the information regarding the reproduced contents may include various information regarding the contents which are reproduced in the first user terminal 100. For example, when real-time broadcasts are being reproduced in the first user terminal 100, information regarding the contents being reproduced may include information regarding a channel selected by the user terminal 100. In addition, when streaming contents are reproduced in the first user terminal 100, information regarding the contents being reproduced may include a network address to receive streaming of the contents being reproduced and information on time when the contents start being reproduced in the user terminal 100.

The second user terminal 300 may reproduce contents using information regarding the reproduction of contents.

For example, when the contents being reproduced in the first user terminal 100 are real-time broadcasts, the second user terminal 300 may select and provide a channel which is the same as the broadcast being reproduced in the first user terminal 100. In addition, when the contents being reproduced in the first user terminal 100 are streaming contents, the second user terminal 300 may access a web server (not shown) using a network address and receive streaming of the contents. In this case, the second user terminal 300 may receive streaming of the contents from the same point of time when the contents are currently reproduced in the first user terminal 100 based on the time information.

As such, the second user terminal 300 may provide the same contents which are being reproduced in the first user terminal at the same reproduction time as in the first user terminal 100 and thus, users may watch the same contents even though they are in different locations. In addition, as users may exchange opinions regarding the contents via SNS while watching the same contents, they may form a common ground easily.

Figure 2:
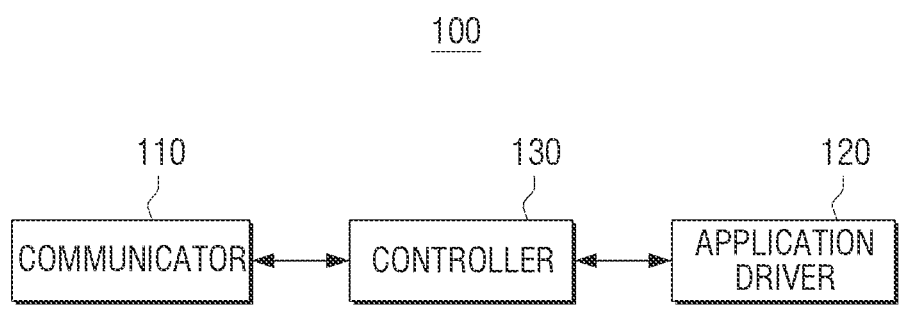
FIG. 2 is a block diagram provided to explain a configuration of a user terminal according to an embodiment of the present disclosure.

FIG. 2 is a block diagram provided to explain a configuration of a user terminal according to an embodiment of the present disclosure.

Referring to FIG. 2, the user terminal 100 comprises a communicator 110, an application driver 120, and a controller 130. In an embodiment, both the first user terminal 100 and the second user terminal 300 may have the configuration of FIG. 2. Accordingly, the configuration of FIG. 2 will be divided into two cases and described accordingly.

First of all, a case where the first user terminal 100 is realized in the configuration of FIG. 2 will be described.

The communicator 110 performs communication with an SNS providing server (e.g., 200 of FIG. 1). For example, the communicator 110 may connect to the SNS providing server 200 via network communication, and transmit and receive an SNS message to and from the SNS providing server 200.

In addition, the communicator 110 performs communication with a web server (not shown). Herein, the web server (not shown) may be provided in a server provider which is separate from a content producer, a content provider, and providing of contents, and may be provided in a streaming form. That is, the communicator 110 may connect to a web server (not shown) via a network communication, and receive streaming of contents.

The application driver 120 may drive various applications installed in the user terminal 100. Herein, the application refers to an application program which is executable by itself.

For example, the application driver 120 may drive an SNS providing application to perform communication with other users. For example, the application driver 120 may drive an SNS providing application so that various screens to perform communication with other users can be output. For example, when an SNS message input from another user terminal (e.g., 300 of FIG. 1) is received, the application driver 120 may display the corresponding SNS message on the screen, and when an SNS message is input from the user terminal 100, the application driver 120 may display the corresponding SNS message on the screen and transmit the message to another user terminal simultaneously.

Further, the application driver 120 may drive a content play application to reproduce contents. For example, the application driver 120 may drive the content play application to select and output a broadcast signal which is broadcast in real time from a broadcasting station. In addition, the application driver 120 may stream and output contents which are provided via a network communication (for example, Internet) by driving the content play application. For example, the application driver 120 may connect to a web server (not shown) which is prepared by a service provider separately from a content manufacturer, a content provider, and providing of contents, and receive broadcast contents, Internet contents, Video On Demand (VoD) contents, etc. in a streaming form.

The controller 130 controls overall operations of the user terminal 100. For example, the controller 130 may control to drive a selected application according to user manipulation.

For example, when a user selects an SNS providing application, the controller 130 may control the communicator 110 to receive an SNS message that another user terminal 300 has transmitted to the user terminal 100, from the SNS providing server 200. In addition, the controller 130 may control the communicator 110 to transmit the corresponding SNS message to the SNS providing server 200 in order to transmit the SNS message input from the user terminal 100 to the other user terminal 300. Accordingly, the other user terminal 300 may receive the SNS message which the user terminal 100 has transmitted to the other user terminal 300, from the SNS providing server 200. In addition, the controller 130 may control the application driver 120 to display the corresponding SNS message on the screen.

In an embodiment of the present disclosure, when a user selects a content play application, the controller 130 may control the application driver 120 to receive a real-time broadcast signal by controlling elements such as a tuner (not shown), a demodulator (not shown), an equalizer (not shown) and display the received broadcast signal on the screen. In addition, the controller 130 may control the application driver 120 to receive contents in a streaming form via a network communication (for example, Internet) and display the received streaming contents on the screen.

Meanwhile, when a predetermined event occurs while the SNS providing application is being operated, the controller 130 may control to share information regarding reproduction of contents with another user by transmitting information regarding the contents being reproduced through the content play application to the SNS providing server 200.

Herein, the predetermined event may include at least one of a point of time when a content play command is input and a point of time when a menu button to share reproduction of contents is selected. For example, when the content play application is operated and contents are reproduced while the SNS providing application is operated, the controller 130 may control the communicator 110 to transmit information regarding reproduction of the contents to the SNS providing server 200. In addition, when the content play application is operated and contents are reproduced while the SNS providing application is operated, and then a separate menu displayed on the screen is selected by a user, the controller 130 may control the communicator 110 to transmit information regarding reproduction of the contents to the SNS providing server 200.

Further, when the contents are real-time broadcasts, the information regarding reproduction of contents may include information regarding a broadcast channel which is reproduced in the user terminal 100, and when the contents are streaming contents, the information regarding reproduction of contents may include information regarding a network address where the streaming of contents can be received and information regarding a time when a predetermined event occurs. That is, the controller 130 may transmit information regarding reproduction of contents corresponding to a content type to the SNS providing server 200.

For example, when a content play application to reproduce a real-time broadcast is operated, the controller 130 may control the communicator 110 to transmit information regarding a broadcast channel reproduced in the user terminal 100 to the SNS providing server 200 in order to transmit information regarding a broadcast channel reproduced in the user terminal 100 to another user terminal 300. In addition, when a content play application to reproduce a streaming content is operated, the controller 130 may control the communicator 110 to transmit the corresponding information to the SNS providing server 200 in order to transmit a Uniform Resource Locator (URL) address where streaming of contents being reproduced can be received and information regarding time when the streaming of contents is started to the other user terminal 300.

Accordingly, the other user terminal 300 may receive information regarding reproduction of contents from the SNS providing server 200, and the user terminal 100 may share information regarding reproduction of contents with another user.

Meanwhile, in the above embodiment of the present disclosure, when a real-time broadcast is reproduced in the user terminal 100, the controller 130 controls to transmit channel information to the SNS providing server 200, but in this case, the controller 130 may control to transmit information regarding a time when a predetermined event occurs to the SNS providing server 200 as well. That is, the controller 130 may select and transmit information regarding a time when a broadcast is selected and reproduced to the SNS providing server 200.

In addition, the controller 130 may control to transmit information regarding each content to the SNS providing server 200. For example, when a real-time broadcast is reproduced in the user terminal 100, the controller may transmit the name of the broadcast program which is reproduced to the SNS providing server 200, and when a streaming content is reproduced in the user terminal 100, the controller 130 may transmit the name of the streaming content to the SNS providing server 200.

Meanwhile, the controller 130 may generate information regarding reproduction of contents in a form that can be interpreted by the SNS providing server 200 and transmit the information to the SNS providing server 200 according to a protocol which is pre-defined between the user terminal 100 and the SNS providing server 200. For example, the controller 130 may control to generate at least one of information regarding the type of contents, the name of contents, the channel information regarding contents, the time of reproducing contents, the network address through which contents streaming can be received in the form of natural language according to a preset template and transmit the information to the SNS providing server 200. For example, when the user terminal 100 reproduces "World-cup qualifier" in "channel 9" at "20:30", the controller 130 may record information regarding reproduction of contents such as "type of contents: broadcast, name of contents: World-cup qualifier, channel for providing contents: channel 9, time of reproducing contents: 20:30" in a predetermined template, and transmit the information to the SNS providing server 200. However, this is only an example, and the controller 130 may generate information regarding reproduction of contents in various forms which can be generally interpreted in the SNS providing server 200 such as Twitter, Facebook, Kakao Talk, and so on.

In addition, the controller 130 may transmit information regarding reproduction of contents to the SNS providing server 200 by each user account. Herein, the user account may refer to an identification (ID) of a site which provides an SNS. That is, when a user of the user terminal 100 creates his or her account on an SNS site such as Twitter, Facebook, etc., the controller 130 may transmit information regarding reproduction of contents to the SNS providing server 200 through the user account.

Subsequently, a case where the second user terminal 300 is realized in the form of FIG. 2 will be described.

The communicator 110 performs communication with the SNS providing server 200. For example, the communicator 110 may connect to the SNS providing server 200 using a mobile communication network such as 3rd Generation (3G), $4^{th}$ Generation (4G), etc., and transmit and receive an SNS message to and from the SNS providing server 200.

In addition, the communicator 100 performs communication with a web server (not shown). Herein, the web server (not shown) may be provided in a service provider which is separate from a content manufacturer, a content provider, and providing of contents, and may provide contents in a streaming form. That is, the communicator 110 may connect to a web server (not shown) via a network communication and receive streaming of contents.

The application driver 120 may drive various applications installed in the user terminal 100. Herein, the application may refer to an application program which is executable by itself.

For example, the application driver 120 may drive an SNS providing application to perform communication with other users. For example, the application driver 120 may drive an SNS providing application to output various screens to perform communication with other users. For example, when an SNS message input from another user terminal (e.g., 300 of FIG. 1) is received, the application driver 120 may display the corresponding SNS message on the screen, and when an SNS message is input in the user terminal 100, the application driver 120 may display the corresponding SNS message on the screen and transmit the message to the other user terminal 300 simultaneously.

In addition, the application driver 120 may drive a content play application to reproduce contents. For example, the application driver 120 may drive the content play application to select and output a broadcast signal which is broadcast in real time from a broadcasting station. In addition, the application driver 120 may stream and output contents which are provided via a network communication (for example, Internet) by driving the content play application. For example, the application driver 120 may connect to a web server (not shown) which is prepared by a service provider separately from a content manufacturer, a content provider, and providing of contents, and receive broadcast contents, Internet contents, VoD contents, etc. in a streaming form.

The controller 130 controls overall operations of the user terminal 100. For example, the controller 130 may control to drive a selected application according to user manipulation.

For example, when a user selects an SNS providing application, the controller 130 may control the communicator 110 to receive an SNS message that another user terminal 300 has transmitted to the user terminal 100, from the SNS providing server 200. In addition, the controller 130 may control the communicator 110 to transmit the corresponding SNS message to the SNS providing server 200 in order to transmit the SNS message input from the user terminal 100 to the other user terminal 300. Accordingly, the user terminal 100 may receive the SNS message which was transmitted by the other user terminal 300 from the SNS providing server 200. In addition, the controller 130 may control the application driver 120 to display the corresponding SNS message on the screen.

In an embodiment of the present disclosure, when a user selects a content play application, the controller 130 may control the application driver 120 to receive a real-time broadcast signal by controlling elements such as a tuner (not shown), a demodulator (not shown), an equalizer (not shown) and display the received broadcast signal on the screen. In addition, the controller 130 may control the application driver 120 to receive contents in a streaming form via a network communication (for example, Internet) and display the received streaming contents on the screen.

When a predetermined event occurs while the SNS providing application is being operated, the controller 130 may control to receive information regarding reproduction of contents that another user is watching from the SNS providing server 200, and reproduce the corresponding contents according to the received information.

Herein, when the contents are a real-time broadcast, the information regarding reproduction of contents includes information regarding a broadcast channel which is reproduced in a user terminal device. That is, when a user of another user terminal 300 is watching a real-time broadcast through the other user terminal 300, information regarding reproduction of contents may include information regarding a channel of the broadcast which is reproduced in the other user terminal 300.

In addition, when the contents are streaming contents, information regarding reproduction of contents may include information regarding a network address to receive streaming of the contents and information on time when the contents are reproduced. That is, when a user of another user terminal 300 is watching streaming contents through the other user terminal 300, information regarding reproduction of contents may include information regarding a URL address to receive streaming of the contents and information on time when the contents start being reproduced in the other user terminal 300.

Meanwhile, the predetermined event may include a point of time when a user command to receive information regarding reproduction of contents from the SNS providing server 200 is input. In order to receive such a user command, the SNS providing server 200 may transmit a communication window including a separate menu item to the user terminal 100, or display a separate menu item on a web page according to a user account of another user terminal device, which will be explained later with reference to FIG. 5.

The controller may drive a content play application according to a control command received from the SNS providing server 200, and provide a broadcast which is the same as a real-time broadcast that another user is watching based on information regarding a broadcast channel. Herein, the control command may include a command to drive a content play application which may provide a real-time broadcast from among applications installed in the second user terminal 300.

In other words, when a user of another user terminal 300 is watching a real-time broadcast through the other user terminal 300, the controller 130 drives a content play application which may provide a real-time broadcast according to a control command received from the SNS providing server 200. Subsequently, the controller 130 may control to select and output the same channel as a broadcast which is reproduced in the other user terminal 300 using channel information received from the SNS providing server 200. For example, when channel information received from the SNS providing server 200 is channel 9, the controller 130 may control the application driver 120 to select a broadcast signal by selecting channel 9 and display the received broadcast signal on the screen.

In addition, the controller 130 may drive a content play application according to a control command received from the SNS providing server 200, and provide streaming of contents at a point of time which is the same as the reproduction time of streaming contents that another user is watching based on a network address and time information. Herein, the control command may include a command to drive a content play application which may receive and provide streaming of contents from among applications installed in the user terminal 100.

That is, when a user of another user terminal 300 is receiving and watching streaming of contents through the other user terminal 300, the controller 130 drives a content play application which may provide streaming of contents according to a control command received from the SNS providing server 200. In addition, the controller 130 may control the application driver 120 to receive and output streaming of contents which is provided by a web server (not shown) through a URL address by controlling the communicator 110 to connect to a URL address received from the SNS providing server 200.

In this case, the controller 130 may control to calculate the reproduction time of streaming contents which are reproduced in another user terminal 300 using time information, and reproduce the streaming contents based on the calculated value. For example, the controller 130 may control to calculate the reproduction time of streaming contents which are reproduced in the other user terminal 300 using the difference between the reproduction time of contents in the other user terminal 300 and the current time, and receive and output streaming of contents from the calculated reproduction time. For example, if the time information, that is, the reproduction time of contents in the other user terminal 300 is 20:30, and the current time is 21:00, the controller 130 may calculate 30 minutes of time difference between 20:30 and 21:00, and control the application driver 120 to reproduce contents from the reproduction time that is 30 minutes later by requesting a web server (not shown) to stream the contents from the reproduction time which is 30 minutes later. Accordingly, the user of the user terminal 100 may reproduce the contents from the reproduction time which is the same as the reproduction time of the contents which are reproduced in the other user terminal 300.

Figure 3:
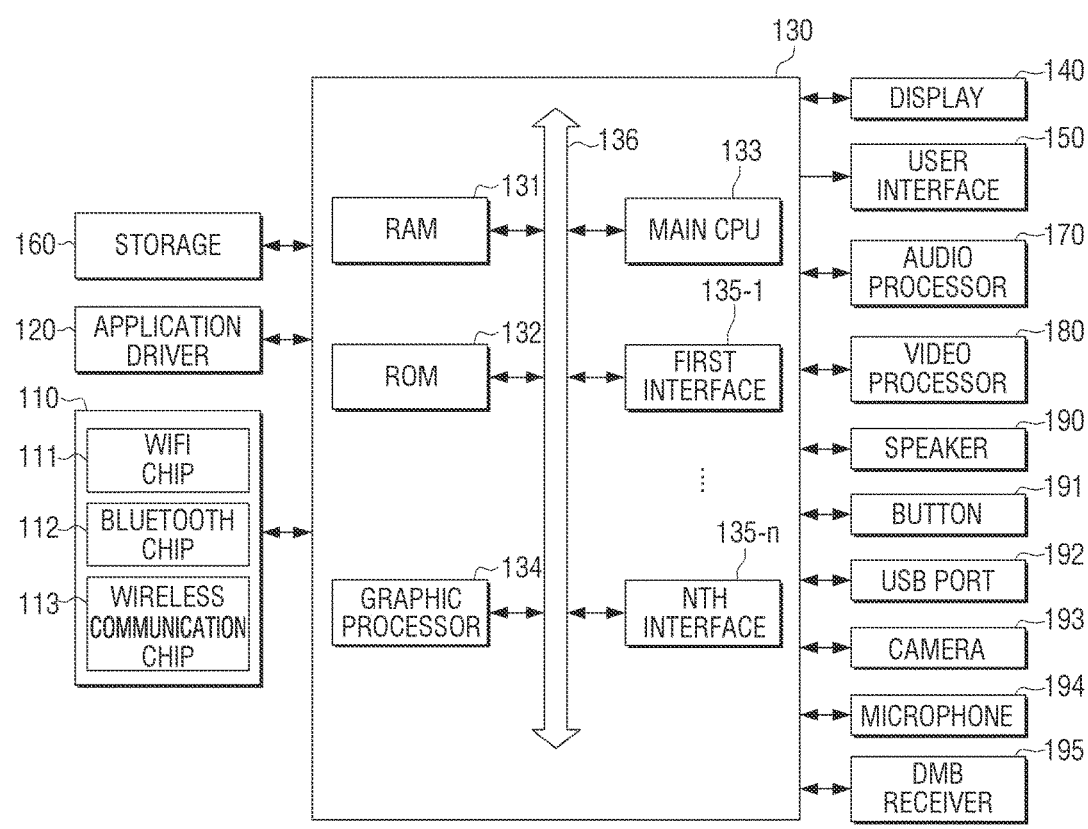
FIG. 3 is a block diagram provided to explain a configuration of a user terminal according to an embodiment of the present disclosure.

FIG. 3 is a block diagram provided to explain a configuration of a user terminal according to an embodiment of the present disclosure.

Referring to FIG. 3, the user terminal 100 comprises the communicator 110, the application driver 120, the controller 130, a display 140, an input unit 150, a storage 160, an audio controller 170, a video processor 180, a speaker 190, a button 191, a Universal Serial Bus (USB) port 192, a camera 193, and a microphone 194. The elements of FIG. 3 which are overlapped with those of FIG. 2 will not be described in detail.

The operations of the above-described controller 130 may be performed by a program stored in the storage 160. The storage 160 may store an Operating System (O/S) software module to drive the user terminal devices 100 and 200, various applications, various data which is input or set during execution of applications, contents, and so on.

Other various software modules which are stored in the storage 160 will be explained later with reference to FIG. 4.

The communicator 110 is an element which performs communication with various types of external apparatuses according to various types of communication methods. The communicator 110 may include various communication chips such as a Wi-Fi chip 111, a Bluetooth chip 112, a wireless communication chip 113, and so on.

The Wi-Fi chip 111 and the Bluetooth chip 112 perform communication according to a Wi-Fi method and a Bluetooth method, respectively. The wireless communication 113 chip refers to a chip which performs communication according to various communication standards such as Institute of Electrical and Electronics Engineers (IEEE), Zigbee, 3G, 3G Partnership Project (3GPP), Long Term Evolution (LTE), and so on. As such, the communicator 110 may have various communication chips and perform communication with other apparatuses through a network communication.

In addition, the communicator 110 may further include a Near Field Communication (NFC) chip which operates according to an NFC method by using 13.56 MHz from among various Radio Frequency ID (RF-ID) frequency bands such as 135 kHz, 13.56 MHz, 433 MHz, 860~960 MHz, 2.45 GHz, and so on.

The display 140 displays a screen. Herein, the screen may include an application execution screen including various objects such as an image, a moving image, a text, etc., a Graphic User Interface (GUI) screen, a home screen including a plurality of icons, a web page screen, and so on. Meanwhile, an icon corresponding to an application installed in the user terminal 100 may be displayed on the home screen in an interface form, but this is only an example.

Meanwhile, the display 140 may be realized as a Liquid Crystal Display Panel (LCD), Organic Light Emitting Diodes (OLED), and so on, but is not limited thereto. For example, the display 140 may be realized in a touch screen form which includes an interlayer structure with a touch pad. In this case, the display 140 may be used not only as an output apparatus but also as the user interface 150 which will be explained later. Herein, the touch screen may be configured to detect not only location and size of a touch input but also pressure of a touch input.

The user interface 150 is an element to receive a user command. For example, the user interface 150 may receive various user commands such as a command to drive an application, a user command to display a list of SNS providing applications, a command to input an SNS message according to execution of an SNS providing application, a command to reproduce contents according to execution of a content play application, a command to share contents, and a user command to receive information regarding reproduction of contents from the SNS providing server 200.

To do so, the user interface 150 may be realized as a touch pad, a key pad including various function keys, number keys, special keys, text keys, etc., or a touch screen.

For example, when the user interface 150 is realized in the form of a touch screen along with the display 140, the controller 130 may display a menu screen to receive a user command and perform an operation corresponding to a selected menu screen. For example, the controller 130 may drive an application which is selected on the home screen, and display an application execution screen on the display 140. In addition, when an SNS providing application is operated, the controller 130 may control the application driver 120 to display an SNS message input from another user terminal (that is, 300 of FIG. 1) and a communication window including an SNS message input from the user terminal 100, or a web page screen on the display 110.

Further, when a content play application is operated, the controller 130 may control the application driver 120 to display a real-time broadcast or a screen of reproduction of streaming contents on the display 110.

Meanwhile, when the configuration of FIG. 3 is realized as the second user terminal 300, and if a separate menu is selected on a communication window or a web page screen, the controller 130 may request the SNS providing server 200 to transmit information regarding reproduction of contents and a control command to drive a content play application, and control the communicator 110 to receive the information regarding reproduction of contents and the control command.

The audio processor 170 is an element which processes audio data. The audio processor 170 may perform various processing with respect to audio data such as decoding, amplification, noise filtering, and so on.

The video processor 180 is an element which processes video data. The video processor 180 may perform various processing with respect to video data such as decoding, scaling, noise filtering, frame rate conversion, resolution conversion, and so on.

The speaker 190 is an element which outputs not only various audio data processed by the audio processor 180 but also various alarm sounds and voice messages.

The button 191 may be configured in various ways such as mechanical button, touch pad, wheel, etc. which are formed on a certain area of the user terminal 100, such as on the front, side, or real of the external surface of the main body. For example, a button to turn on/off the power of the user terminal 100 may be provided.

The USB port 192 may perform communication with various external apparatuses through a USB cable or perform recharging.

The camera 193 is an element to photograph a still image or a moving image under the control of a user. The camera 193 may consist of a plurality of cameras such as a front camera and rear camera.

The microphone 194 is an element to receive a user voice or other sound and convert the same to audio data. The controller 130 may use a user voice input through the microphone 194 during a call, or may convert the user voice into audio data and store the same in the storage 140.

When the camera 193 and the microphone 194 are provided, the controller 130 may perform a control operation according to a user voice input through the microphone 194 or a user motion recognized by the camera 193. That is, the user terminal 100 may operate in a motion control mode or a voice control mode. When the user terminal 100 operates in the motion control mode, the controller 130 photographs a user by activating the camera 193, traces a change in a user motion, and performs a corresponding control operation. When the user terminal 100 operates in the voice control mode, the controller 130 analyzes a user voice input through the microphone, and performs a control operation according to the analyzed user voice.

In addition, various external input ports to connect to various external terminals such as headset, mouse, Local Area Network (LAN), etc. may be further included.

A Digital Multimedia Broadcasting (DMB) receiver 195 is an element which receives and processes a DMB signal. For example, when a user drives a content play application to watch a DMB broadcast in a real-time broadcast, the controller 130 may control elements such as a tuner (not shown), a demodulator (not shown), an equalizer (not shown), etc. provided on the DMB receiver 195 so that a real-time broadcast signal is received and the received broadcast signal is displayed on the display 140.

Meanwhile, the controller 130 controls overall operations of the user terminal 100 using various programs stored in the storage 160.

For example, the controller 130 may execute an application stored in the storage 160 and configure and display the execution screen, and may reproduce various contents stored in the storage 160. Further, the controller 130 may perform communication with external apparatuses through the communicator 110.

For example, the controller 130 comprises a Random Access Memory (RAM) 131, a Read Only Memory (ROM) 132, a main Central Processing Unit (CPU) 133, a graphic processor 134, a first to nth interfaces 135-1~135-n, and a bus 136.

The RAM 131, the ROM 132, the main CPU 133, the graphic processor 134, and the first to nth interfaces 135-1~135-n may be connected to each other through the bus 136.

The first to nth interfaces 135-1~135-n are connected to the above-described various components. One of the interfaces may be a network interface which is connected to an external apparatus via network.

The main CPU 133 access the storage 160 and performs booting using an O/S stored in the storage 160, and performs various operations using various programs, contents, and data stored in the storage 160.

The ROM 132 stores a set of commands for system booting. If a turn-on command is input and power is supplied, the main CPU 133 copies an O/S stored in the storage 140 onto the RAM 131 according to a command stored in the ROM 132 and boots a system by executing the O/S. If the booting is completed, the main CPU 133 copies various application programs stored in the storage 140 onto the RAM 131 and performs the various operations by executing the application programs copied in the RAM 131.

The graphic processor 134 generates a screen including various objects such as an icon, an image, and a text using a computing unit (not shown) and a rendering unit (not shown). The computing unit computes property values such as coordinates, shape, size, and color of each object to be displayed according to the layout of the screen using a control command received from the input unit 134. The rendering unit generates a screen with various layouts including objects based on the property values computed by the computing unit. The screen generated by the rendering unit is displayed within the display area of the display 110.

Albeit not illustrated in the drawing, the user terminal 100 may further comprise a sensor (not shown).

The sensor (not shown) may sense various manipulations such as touch, rotation, tilt, pressure, approach, etc. with respect to the user terminal 100.

For example, the sensor (not shown) may include a touch sensor which senses a touch. The touch sensor may be realized as capacitive or resistive sensor. The capacitive sensor calculates touch coordinates by sensing micro-electricity excited by a user body when part of the user body touches the surface of the display 140 using a dielectric coated on the surface of the display 140. The resistive sensor comprises two electrode plates, and calculates a touch coordinates as the upper and lower plates of the touched point contact with each other to sense flowing electric current when a user touches a screen. As such, a touch sensor may be realized in various forms. In addition, the sensor may further comprise a geomagnetic sensor to sense a rotation state and a motion direction of the user terminal 100 and an acceleration sensor to sense the degree of tilt of the user terminal 100.

FIG. 3 illustrates an example of specific elements included in the user terminal 100, but depending on embodiments of the present disclosure, some of the elements illustrated in FIG. 3 may be omitted or changed, or other elements may be added. For example, a Global Positioning System (GPS) receiver (not shown) to receive a GPS signal from GPS satellite and calculate the current location of the user terminal 100 may be further included.

Figure 4:
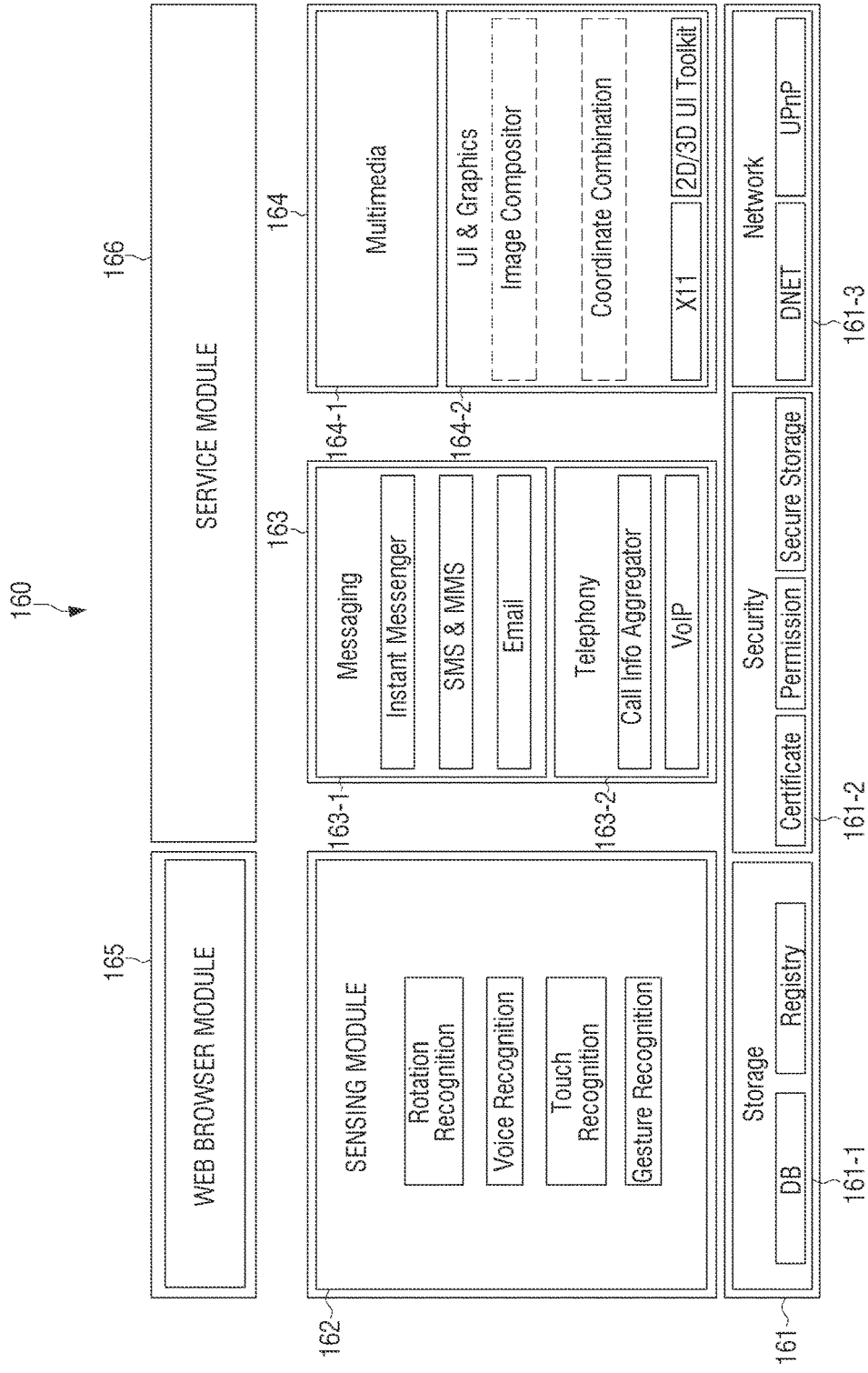
FIG. 4 is a view provided to explain a software configuration stored in a storage according to an embodiment of the present disclosure.

FIG. 4 is a view provided to explain a software configuration stored in a storage according to an embodiment of the present disclosure.

Referring to FIG. 4, the storage 160 may store software including a base module 161, a sensing module 162, a communication module 163, a presentation module 164, and a web browser module 165.

The base module 161 refers to a basic module which processes a signal transmitted from each hardware included in the user terminal devices 100 and 300, and transmits the processed signal to an upper layer module. The base module 161 includes a storage module 161-1, a security module 161-2, and a network module 161-3. The storage module 161-1 is a program module including database or registry. The main CPU 133 may access database in the storage 160 using the storage module 161-1 to read out various data. The security module 161-2 is a program module which supports certification, permission, secure storage, etc. with respect to hardware, and the network module 161-3 is a module which supports network connection, and includes a Distributed.net (DNET) module, a Universal Plug and Play (UPnP) module, and so on.

The sensing module 162 is a module which collects information from various sensors, and analyzes and manages the collected information. The sensing module 162 may include a face recognition module, a voice recognition module, a motion recognition module, and an NFC recognition module, and so on.

The communication module 163 is a module to perform communication with outside. The communication module 163 may include a messaging module 163-1 such as a messenger program, a Short Message Service (SMS) & a Multimedia Message Service (MMS) program, an e-mail program, etc., and a call module 163-2 including a call info aggregator program module, a Voice Over Internet Protocol (VoIP) module, etc.

The presentation module 164 is a module to compose a display screen. The presentation module 164 includes a multimedia module 164-1 for reproducing and outputting multimedia contents, and a UI rendering module 164-2 for UI and graphic processing. The multimedia module 164-1 may include a player module, a camcorder module, a sound processing module, and so on, thereby performing the operations of generating and reproducing various multimedia contents, screens, and sounds. The UI rendering module 164-2 may include an image compositor module for combining images, a coordinates combination module for combining and generating coordinates on the screen where an image is to be displayed, an X11 module for receiving various events from hardware, a two-dimensional (2D)/three-dimensional (3D) UI toolkit for providing a tool for composing UI in 2D or 3D form, and so on.

The web browser module 165 refers to a module which accesses a web server by performing web-browsing. The web browser module 165 may include various modules such as a web view module for composing a web page, a download agent module for downloading, a bookmark module, a web-kit module, and so on.

The service module 166 is a module including various applications for providing various services. For example, the service module 166 may include various program modules such as a navigation program, an SBS reproduction program, a content reproduction program, a game program, an electronic book program, a calendar program, an alarm management program, other widgets, and so on.

FIG. 4 illustrates various program modules, but some of the various program modules may be omitted, changed, or added according to the type and attribute of the user terminal 100. For example, a location-based module which supports a location-based service in association with hardware such as a GPS chip may be further included.

Figure 5:
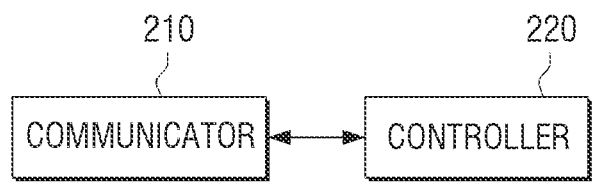
FIG. 5 is a block diagram provided to explain a configuration of a Social Network Service (SNS) providing server according to an embodiment of the present disclosure.

FIG. 5 is a block diagram provided to explain a configuration of an SNS providing server according to an embodiment of the present disclosure.

Referring to FIG. 5, the SNS providing server 200 comprises a communicator 210 and a controller 220.

The communicator 210 performs communication with the first user terminal 100 and the second user terminal 300. For example, the communicator 210 may receive information regarding reproduction of contents from the first user terminal 100 through a network communication (for example, Internet), and transmit the information regarding reproduction of contents to the second user terminal 300.

Herein, when the contents which are reproduced in the first user terminal 100 are a real-time broadcast, the information regarding reproduction of contents may include a broadcast channel which is reproduced in the first user terminal 100, and when the contents which are reproduced in the first user terminal 100 are streaming contents, the information regarding reproduction of contents may include a network address which may receive streaming of the contents which are reproduced in the first user terminal 100 and information on the time when a predetermined event occurs. In this case, the predetermined event may include at least one of a point of time when a command to reproduce contents is input in the first user terminal 100 and a point of time when a menu button to share reproduction of contents is selected.

As the above feature has already been described with reference to FIG. 2, further description will not be provided.

The controller 220 controls overall operations of the SNS providing server 200.

For example, the controller 220 may provide communication between a user of the first user terminal 100 and a user of the second user terminal 300.

For example, when the SNS providing server 200 is realized as a server which provides SNS such as Facebook, Twitter, etc., the controller 220 may provide communication between different users by providing a web page for each user account. For example, when a user of the first user terminal 100 uploads a text, an image, etc. onto his or her account, and a user of the second user terminal 300 access a user account of the first user terminal 100, the controller 220 may provide a web page according to a user account of the first user terminal 100 to the second user terminal 300.

In another example, when the SNS providing server 200 is realized as a server which provides SNS such as Kakao Talk, etc., the controller 220 may provide communication between different users by providing a communication window including an SNS message which is exchanged between the users. For example, the controller 220 may control to receive an SNS message which the first user terminal 100 transmits to the second user terminal 300 through the communicator 210 and transmit the corresponding SNS message to the second user terminal 300 so that the corresponding SNS message is displayed in the form of a communication window in the second user terminal 300. Subsequently, the controller 220 may control to receive an SNS message that the second user terminal 300 transmits to the first user terminal 100 through the communicator 210 and transmit the corresponding SNS message to the first user terminal 100 so that the corresponding SNS message is displayed in the form of a communication window in the first user terminal 100.

As such, the controller 220 may control to allow users of the first and the second user terminal devices 100 and 300 to perform communication with each other by exchanging SNS messages.

Meanwhile, the controller 220 may receive information regarding reproduction of contents from the first user terminal 100 and transmit the information to the second user terminal 300 while communication between the first user terminal 100 and the second user terminal is performed.

To do so, the controller 220 may analyze information regarding reproduction of the contents which are generated and transmitted according to a pre-defined protocol between the controller 220 and the first user terminal 100. For example, the controller 220 may parse information regarding type and name of contents, channel information of contents, information on reproduction time of contents, information on network address to receive streaming of contents, etc. from the information regarding reproduction of contents received from the first user terminal 100. However, this is only an example, and various information may be parsed from information received from the first user terminal 100 using a method which is generally used in the SNS providing server 200 such as Twitter, Facebook, Kakao Talk, and so on.

In addition, the controller 220 may provide information regarding reproduction of contents to the second user terminal 300. For example, the controller 220 may provide at least one of information regarding type and name of contents, channel information of contents, information on reproduction time of contents, and information on network address to receive streaming of contents to the second user terminal 300.

For example, when the SNS providing server 200 is realized as a server which provides SNS such as Facebook, Twitter, etc., the controller 220 may upload information regarding reproduction of contents onto a user account of the first user terminal 100. Accordingly, a user of the second user terminal 300 may connect to the user account of the first user terminal 100 and receive the information regarding reproduction of contents. In this case, the controller 220 may display a separate menu item on a web page according to the user account of the first user terminal 100, and when a user of the second user terminal 300 selects the corresponding menu item, may control the communicator 210 to transmit information regarding reproduction of contents which is linked to the menu item to the second user terminal 300.

In another example, when the SNS providing server 200 is realized as a server which provides SNS such as Kakao Talk, etc., the controller 220 may transmit information regarding reproduction of contents to the second user terminal 300.

In this case, the controller 220 may transmit a predetermined SNS message to the second user terminal 300, and when the second user terminal 300 requests for transmission of information regarding reproduction of contents in response to the predetermined SNS message, may transmit the information regarding reproduction of contents to the second user terminal 300. For example, the controller 220 may transmit a communication window including a separate menu item to the second user terminal 300, and when a user of the second user terminal 300 selects the corresponding menu item, the controller 220 may control the communicator 210 to transmit information regarding reproduction of contents which are linked to the menu item to the second user terminal 300.

Meanwhile, the controller 220 may control to transmit a control command to drive a content play application corresponding to information regarding reproduction of contents to the second user terminal 300. For example, the controller 220 may control the communicator 210 to transmit a control command to drive a content play application which may reproduce contents that are being reproduced in the first user terminal 100 to the second user terminal 300. In this case, when the second user terminal 300 requests transmission of a control command, the controller 220 may control to transmit a control command to drive a content play application to the second user terminal 300.

For example, when the SNS providing server 200 is realized as a server which provides SNS such as Facebook, Twitter, etc., the controller 220 may display a separate menu item on a web page according to a user account of the first user terminal 100, and when a user of the second user terminal 300 selects the corresponding menu item, the controller 220 may control the communicator 210 to transmit a control command which is linked to the menu item to the second user terminal 300. In this case, the controller 220 may control to transmit information regarding reproduction of contents as well.

In another example, when the SNS providing server 200 is realized as a server which provides SNS such as Kakao Talk, etc., the controller 220 may transmit a communication window including a separate menu item to the second user terminal 300, and when a user of the second user terminal 300 selects the corresponding menu item, the controller 220 may control the communicator 210 to transmit a control command which is linked to the menu item to the second user terminal 300. In this case, the controller 220 may control to transmit information regarding reproduction of contents as well.

Hereinafter, configurations of various screens which are provided according to various embodiments of the present disclosure will be described with reference to the drawings.

FIGS. 6A, 6B, 6C, 6D, 6E, 6F, 6G, 7A, 7B, 7C, 7D, 7E, and 7F are views provided to explain various screens for contents sharing according to various embodiments of the present disclosure.

First of all, FIGS. 6A to 6G are views illustrating a method for reproducing a real-time broadcast which is the same as the broadcast that a user of the first user terminal 100 is watching through the second user terminal 300 when a user of the first user terminal 100 is watching the real-time broadcast.

Figure 6A:
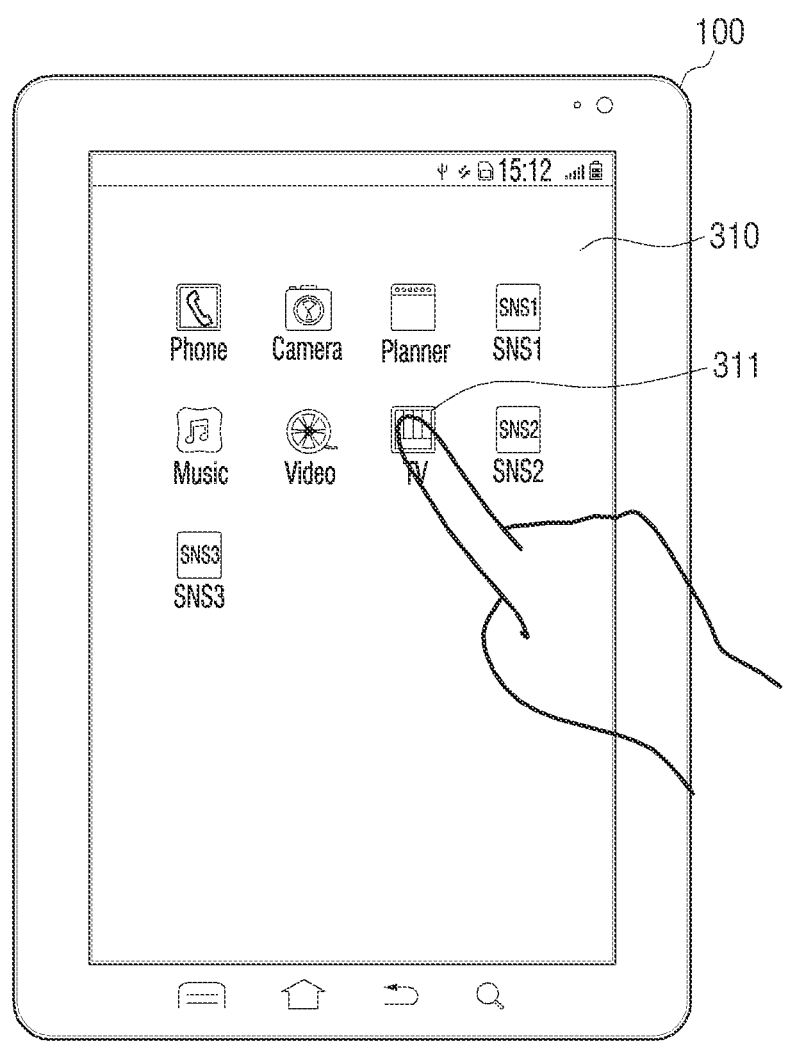

Referring to FIG. 6A, when an icon 311 corresponding to a content play application to reproduce a real-time broadcast on a home screen 310 displayed on the first user terminal 100 is selected, a content play application to reproduce the real-time broadcast may be operated.

Figure 6B:
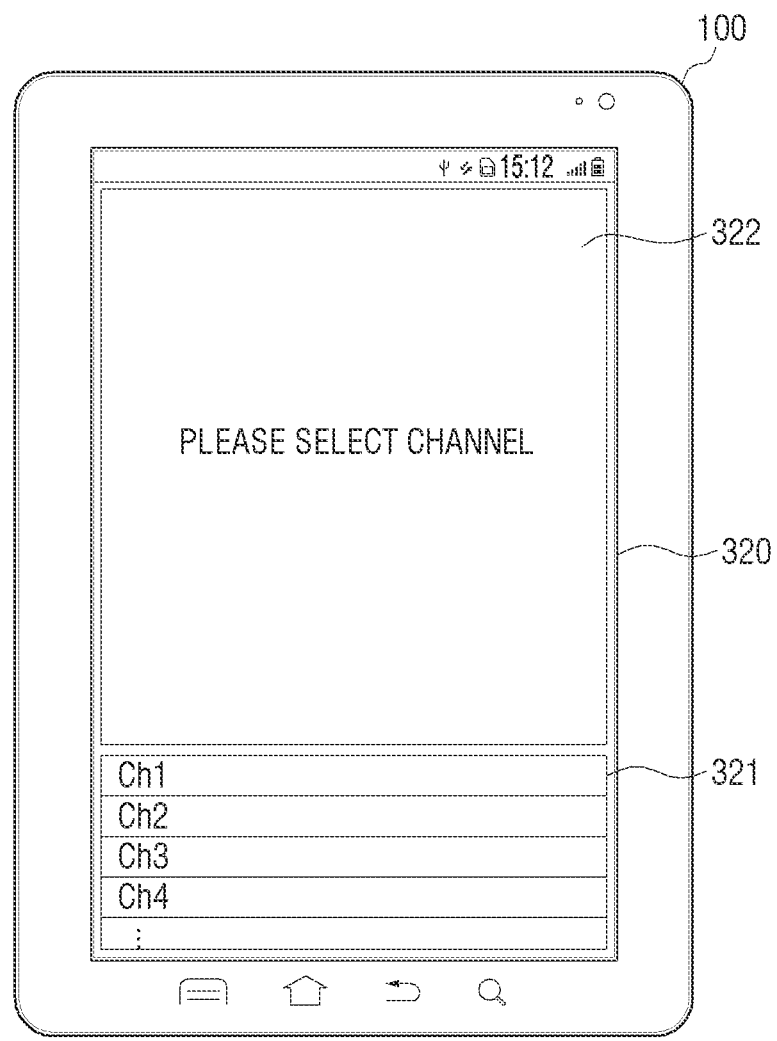

Accordingly, referring to FIG. 6B, an application execution screen 320 including a first area to display a broadcast channel list 321 and a second area to display a broadcast screen 322 may be displayed.

Figure 6C:
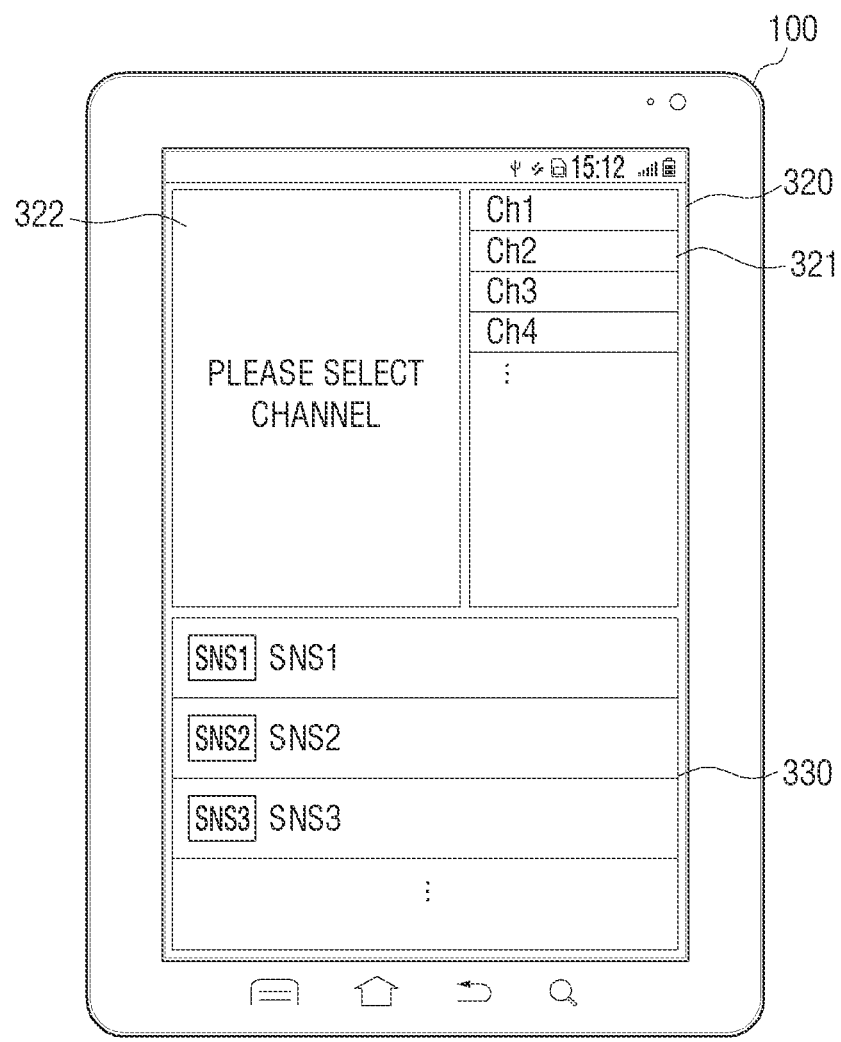

Subsequently, when a user command to display a list regarding an SNS providing application is input, a list 330 regarding an application which may provide SNS from among applications installed in the first user terminal 100 may be displayed as illustrated in FIG. 6C. To do so, the first user terminal 100 may display a separate menu icon on the screen, or provide a list regarding the SNS providing application through a separate menu button (for example, an SNS list view button). However, even if a separate user command is not input, when a content play application is executed through a separate setting item, a list regarding the SNS providing application may be displayed. Meanwhile, the list 330 may include an icon or a name corresponding to each SNS providing application.

Figure 6D:
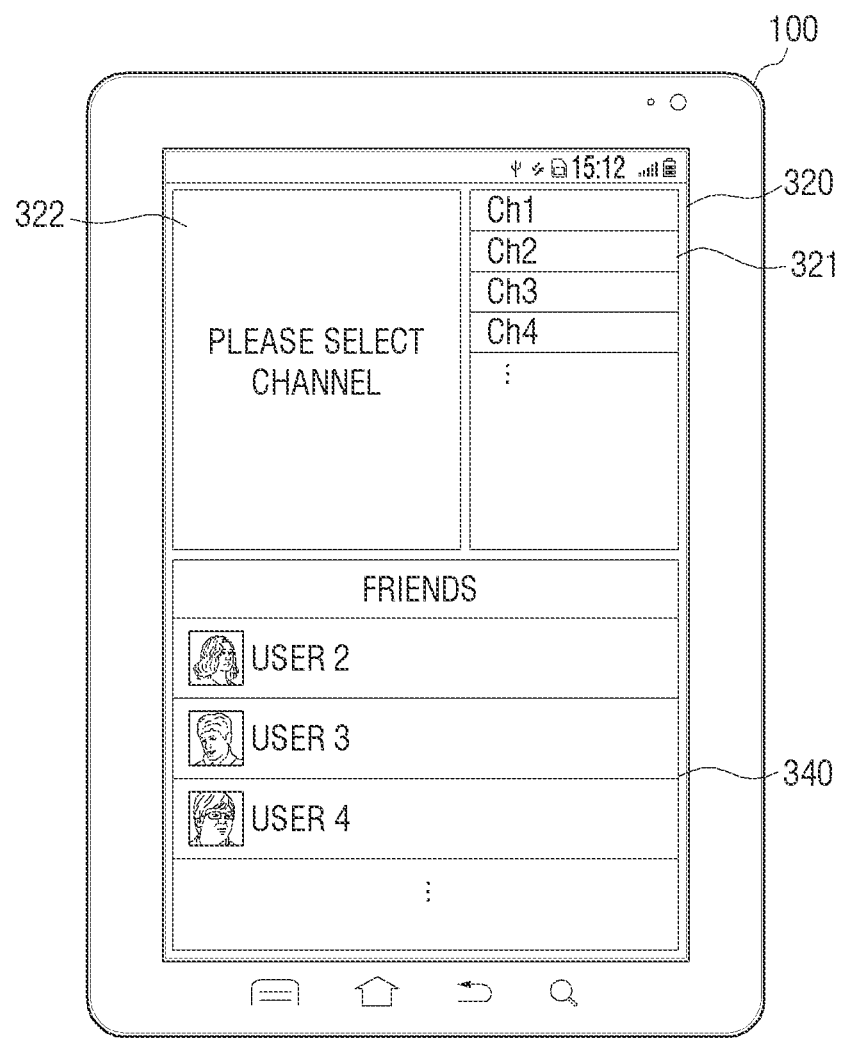

Accordingly, when an SNS providing application is selected on the list 330, the first user terminal 100 may drive the selected SNS providing application and display communication list screen 340 along with the application execution screen 320 according to the execution of a content play application as illustrated in FIG. 6D.

Figure 6E:
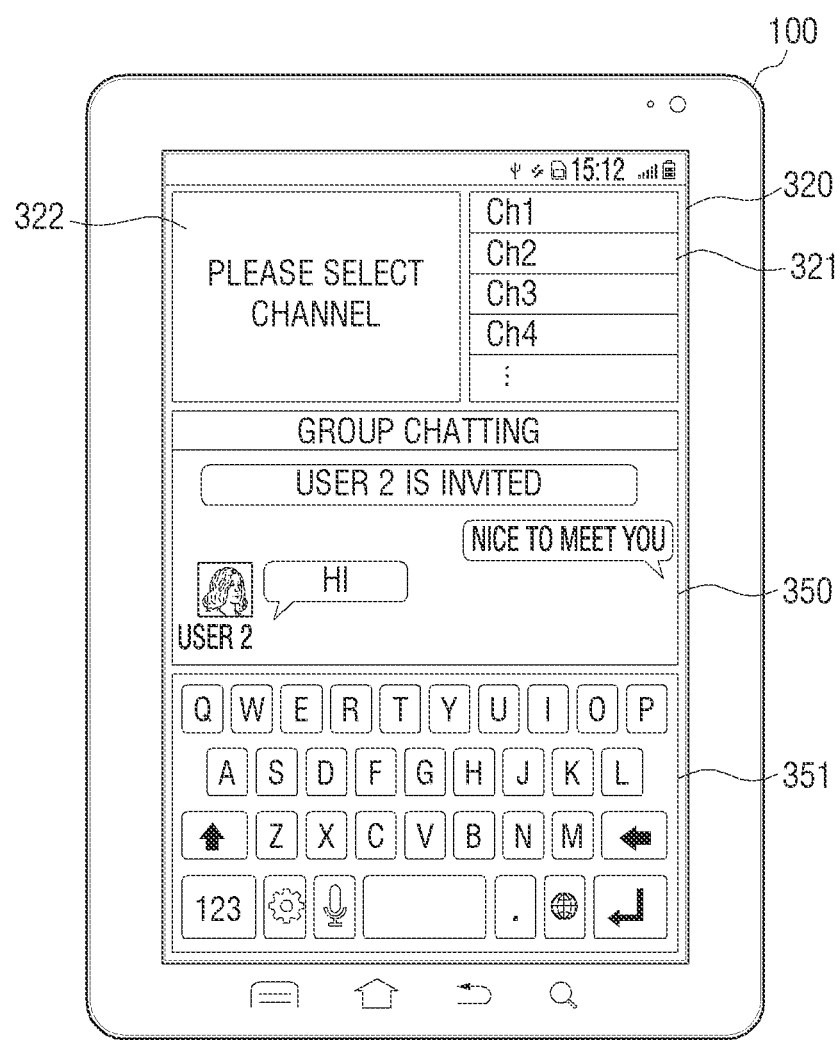

Subsequently, when another user is selected on the list 340 for communication, the first user terminal 100 may display a communication window screen 350 as illustrated in FIG. 6E, and display an SNS message which is input through a virtual keyboard 351 on the communication window screen 350 and transmit the message to the second user terminal 300 of another user (that is, user 2) through the SNS providing server 200. In addition, the first user terminal 100 may receive an SNS message input from the second user terminal 300 from the SNS providing server 200 and display the message on the communication window screen 350.

Figure 6F:
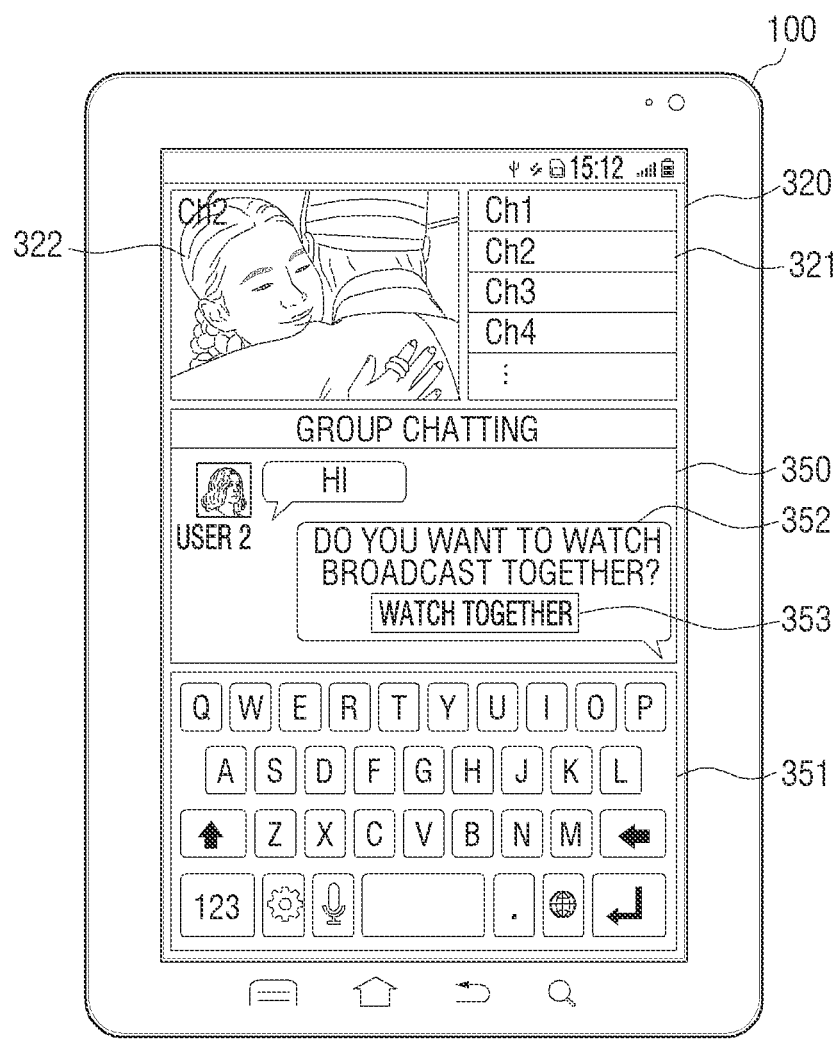

Meanwhile, when a channel is selected on a broadcast channel list 321, the first user terminal 100 may reproduce a real-time broadcast which is received from a selected channel as illustrated in FIG. 6F. In this case, the first user terminal 100 transmits information regarding a broadcast channel which is being reproduced to the SNS providing server 200. The SNS providing server 200 may transmit a predetermined SNS message 352 to the first user terminal 100 and the second user terminal 300.

Figure 6G:
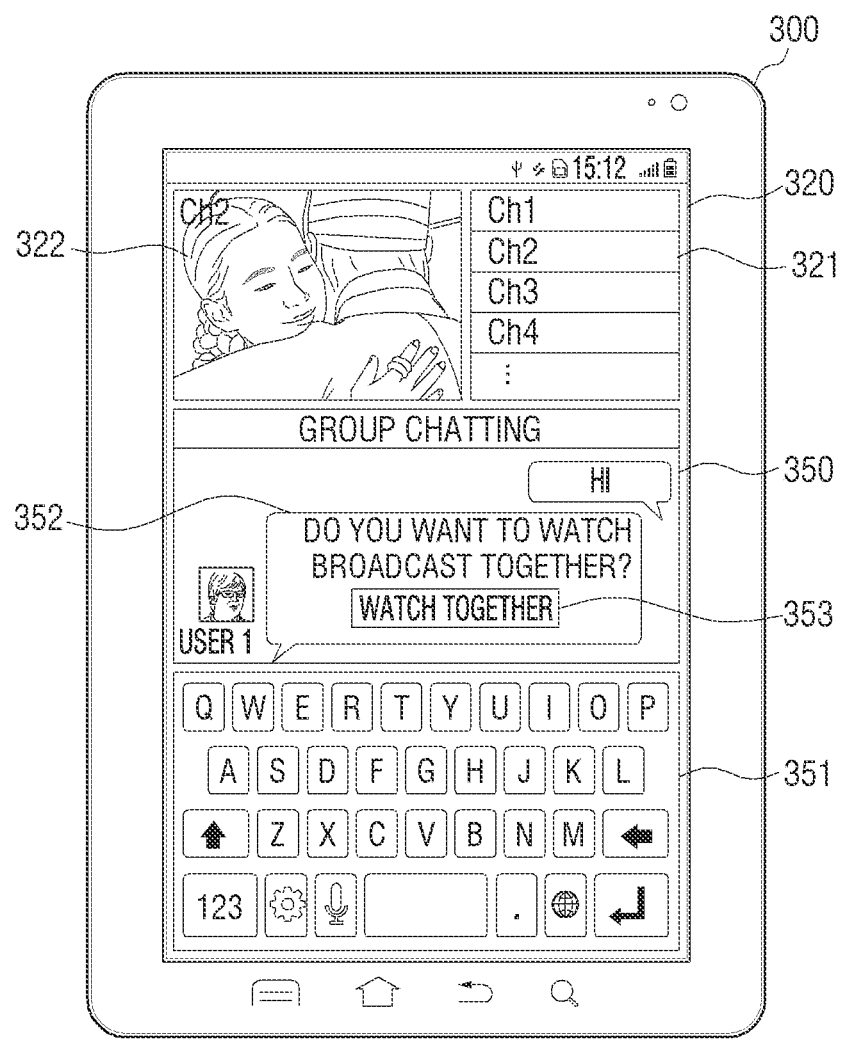

Herein, the predetermined SNS message may include a message inquiring whether to watch the same broadcast as the broadcast which is reproduced in the first user terminal 100 and a separate menu item 353. Accordingly, when a user of the second user terminal 300 selects the corresponding menu item, the SNS providing server 200 may transmit information regarding a broadcast channel linked to the menu item and a control command to the second user terminal 300. Herein, the control command may be a control command to drive a content play application which may reproduce a real-time broadcast. Accordingly, as illustrated in FIG. 6G, the second user terminal 300 may drive a content play application which may reproduce a real-time broadcast according to a control command received from the SNS providing server 200, and select and reproduce a broadcast which is the same as the broadcast being reproduced in the first user terminal 100 based on channel information received from the SNS providing server 200.

Accordingly, users of the first user terminal 100 and the second user terminal 300 may watch the same broadcast and perform communication through SNS.

Meanwhile, FIGS. 7A to 7F are views provided to explain a method for reproducing the same streaming of contents which a user of the first user terminal 100 is watching through the second user terminal 300.

Figure 7A:
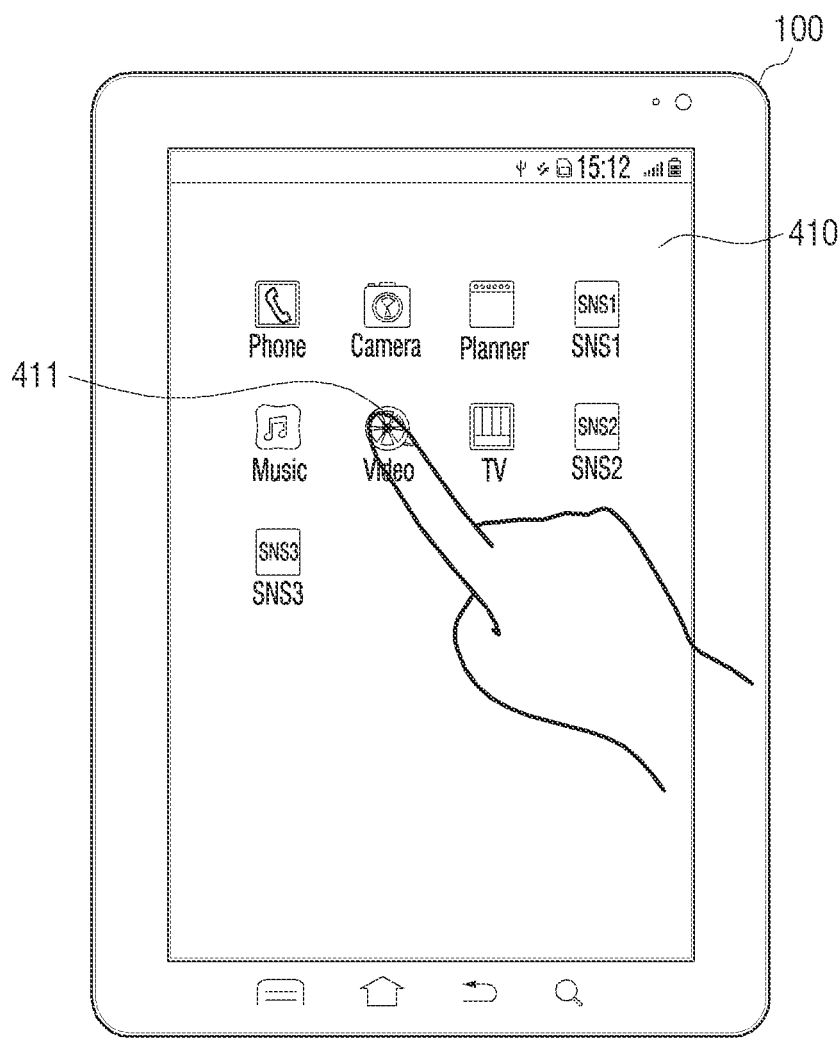

Referring to FIG. 7A, when an icon 411 corresponding to a content play application to reproduce streaming of contents on a home screen 410 displayed on the first user terminal 100 is selected, a content play application to reproduce streaming of contents may be operated.

Figure 7B:
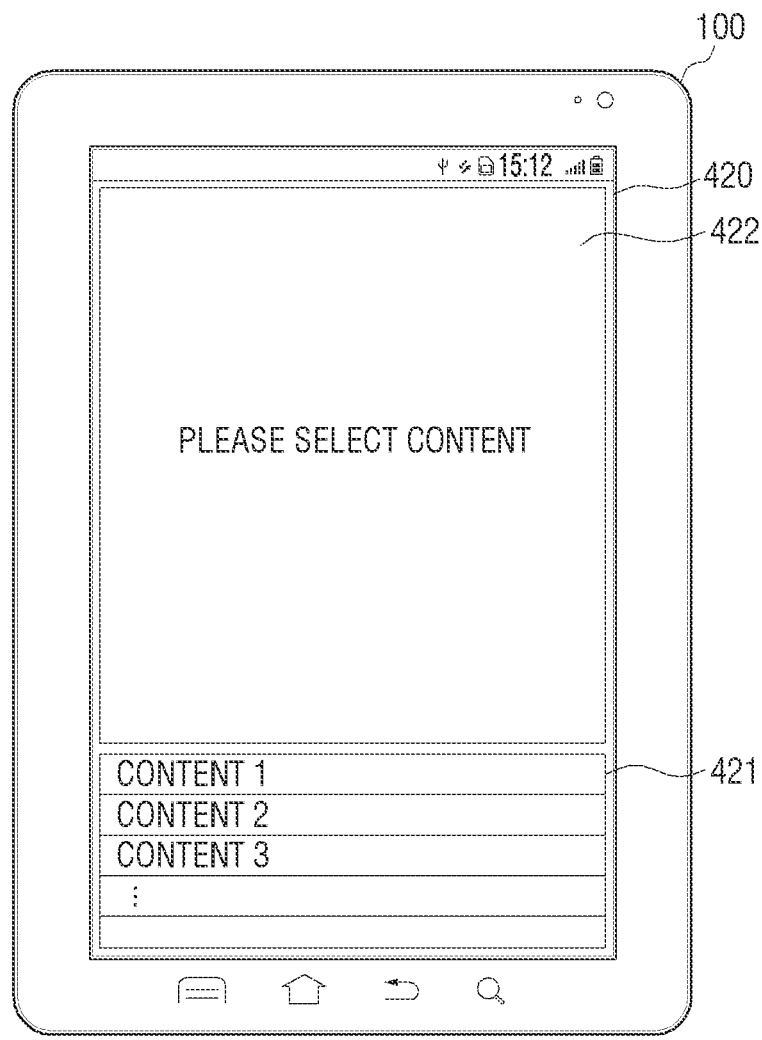

Accordingly, referring to FIG. 7B, an application execution screen 420 including a first area to display a content list 421 and a second area to display a content play screen may be displayed 422.

Subsequently, when a user command to display a list regarding an SNS providing application is input, a list 430 regarding an application which may provide SNS from among applications installed in the first user terminal 100 may be displayed as illustrated in FIG. 7C. To do so, the first user terminal 100 may display a separate menu icon on the screen or provide a list regarding the SNS providing application through a separate menu button (for example, an SNS list view button). However, even if a separate user command is not input, when a content play application is executed through a separate setting item, a list regarding the SNS providing application may be displayed. Meanwhile, the list 430 may include an icon and a name corresponding to each SNS providing application.

Figure 7D:
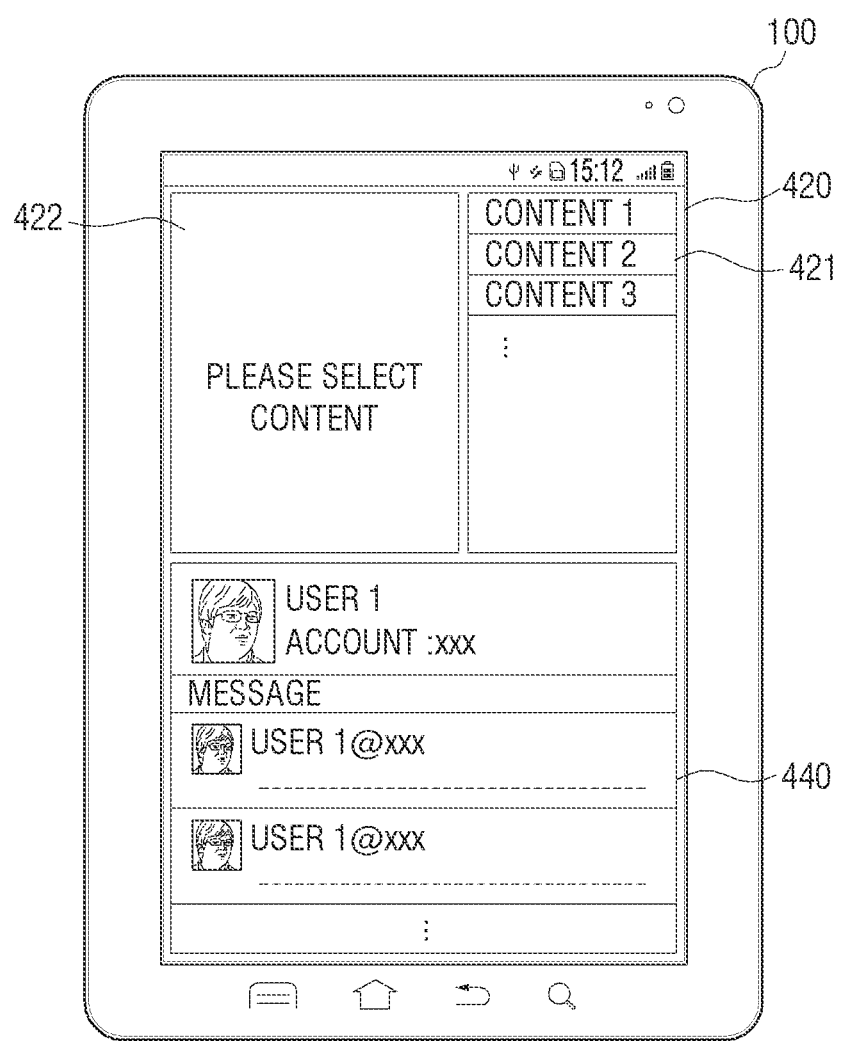

Accordingly, when an SNS providing application is selected on the list 430, the first user terminal 100 may drive the selected SNS providing application and display a web page 440 along with the application execution screen 420 according to the execution of a content play application. For example, when SNS 2 is selected, the web page 440 according to a user account of the first user terminal 100 may be displayed along with the application execution screen 420 according to the execution of a content play application as illustrated in FIG. 7D.

Figure 7E:
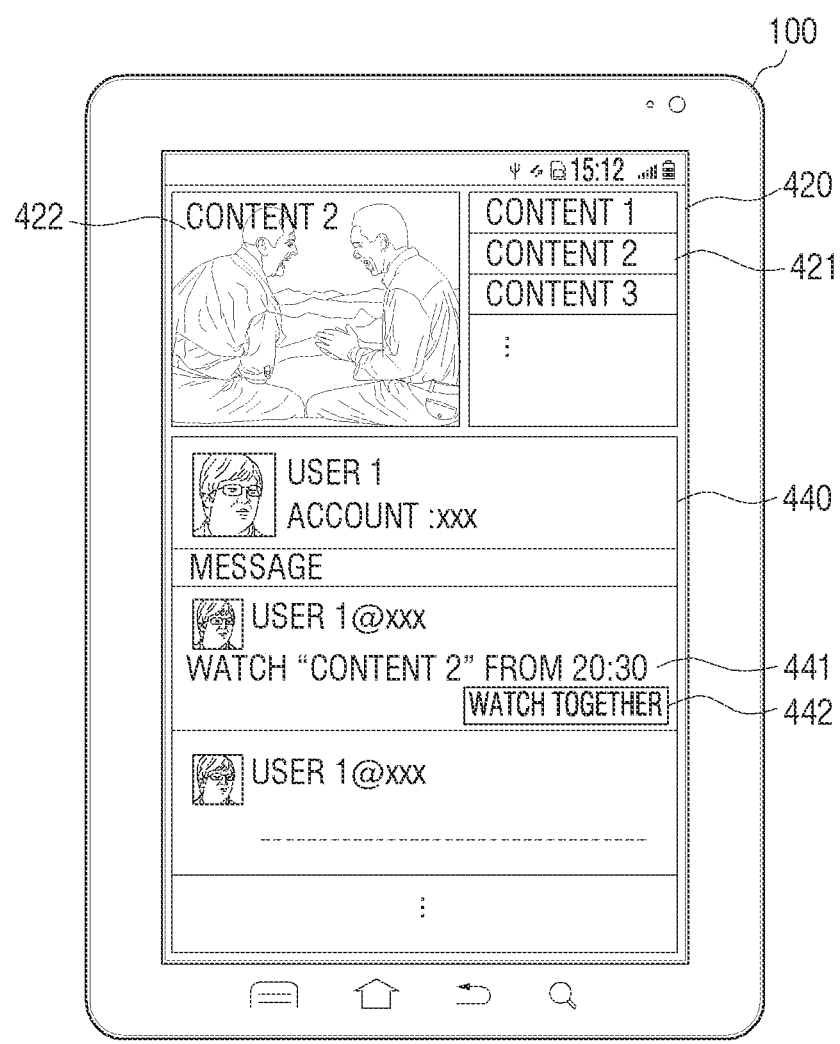

Subsequently, when a content is selected on the content list 421, the first user terminal 100 may receive and reproduce streaming of the selected content as illustrated in FIG. 7E. In this case, the first user terminal 100 may transmit information regarding reproduction of contents to the SNS providing server 200, the SNS providing server 200 may upload the information onto a user account. Herein, the information regarding reproduction of contents may include information on a network address where streaming of contents which are reproduced in the first user terminal 100 may be received, information on the time when reproduction of contents starts in the first user terminal 100 (that is, the time when streaming of contents starts), and information on the name of contents. Meanwhile, the SNS providing server 200 may upload an SNS message 441 including the time when reproduction of contents starts in the first user terminal 100 and the name of contents onto a user account as illustrated in FIG. 7E. In this case, the SNS message 441 which is uploaded onto the user account may include a separate menu item 442.

Accordingly, a user of the second user terminal 300 connects to a webpage according to a user account of the first user terminal 100 and selects the menu item 442, the SNS providing server 200 may transmit information regarding the time when reproduction of contents linked to the menu item starts, a network address, and a control command to the second user terminal 300. Herein, the control command may be a control command to drive a content play application which may reproduce streaming of contents.

Figure 7F:
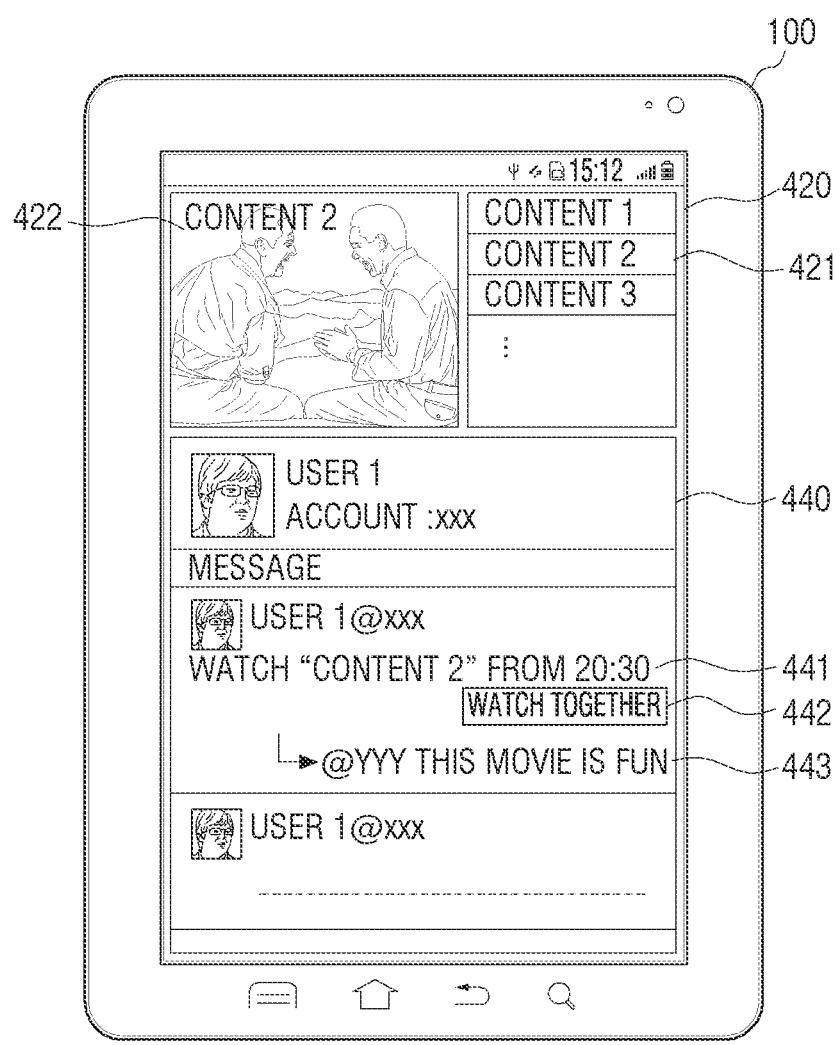

Accordingly, referring to FIG. 7F, the second user terminal 300 may drive a content play application which may reproduce streaming of contents according to a control command received from the SNS providing server 200, and receive and reproduce streaming of contents from the same time as reproduction of contents which are reproduced in the first user terminal based on the network address and time information received from the SNS providing server 200. For example, if the when contents are reproduced in the first user terminal 100 is 20:30, and the current time is 21:00, the second user terminal 300 may receive and reproduce streaming of contents from the reproduction time which is 30 minutes later. In addition, a user of the second user terminal 300 may connect to the web page 440 according to a user account of the first user terminal 100 by driving SNS 2 and upload an SNS message 443.

Accordingly, users of the first user terminal 100 and the second user terminal 300 may watch the same broadcast and perform communication through SNS.

Meanwhile, in FIGS. 6A to 7F, when contents are reproduced, information regarding reproduction of contents is transmitted, but this is only an example. That is, the first user terminal 100 may display a separate menu on an execution screen according the execution of a content application and receive a user command to share reproduction of contents. Accordingly, when a user selects the corresponding menu, the first user terminal 100 may transmit information regarding reproduction of contents to the SNS providing server 200.

In addition, albeit not illustrated in FIGS. 6A to 7F, various menus may be displayed on an application execution screen which is displayed as a content play application is operated.

For example, a menu to change a broadcast channel which is reproduced on the application execution screen or a menu to receive a user command to change streaming contents being reproduced to another contents may be displayed on the application execution screen. In this case, the controller which is of a user terminal where the corresponding command is input controls the communicator 110 to transmit the changed information to the SNS providing server 200, and the SNS providing server 200 may transmit the received information to another user terminal device.

For example, the controller 130 may control to transmit information regarding the changed broadcast channel to the SNS providing server, and the SNS providing server 200 may transmit the corresponding information to another user terminal device. Accordingly, the other user terminal may change channels based on the channel information received from the SNS providing server 200. In addition, the controller 130 may control to transmit a network address which may receive the streaming of changed contents and information on the time when the command to change contents is input to the SNS providing server 200, and the SNS providing server 200 may transmit the corresponding information to another user terminal device. Accordingly, the other user terminal may calculate a reproduction time to receive streaming based on the time information received from the SNS providing server 200, and receive and reproduced streaming of new contents from the calculated reproduction time. That is, the controller 130 of the other user terminal may control to calculate a reproduction time of streaming of contents which are reproduced in a user terminal using a difference in time between the time when a command to change contents is input in the user terminal and the current time, and receive and output the streaming of contents from the calculated reproduction time.

In another example, a menu to receive a user command to capture or share a broadcast or content which is reproduced on an application execution screen may be displayed. In this case, the controller 130 of a user terminal where the corresponding command is input may capture broadcast content or content which is reproduced currently, and transmit the captured image to another user terminal through the SNS providing server 200 or upload the captured image onto a user account.

Figure 8:
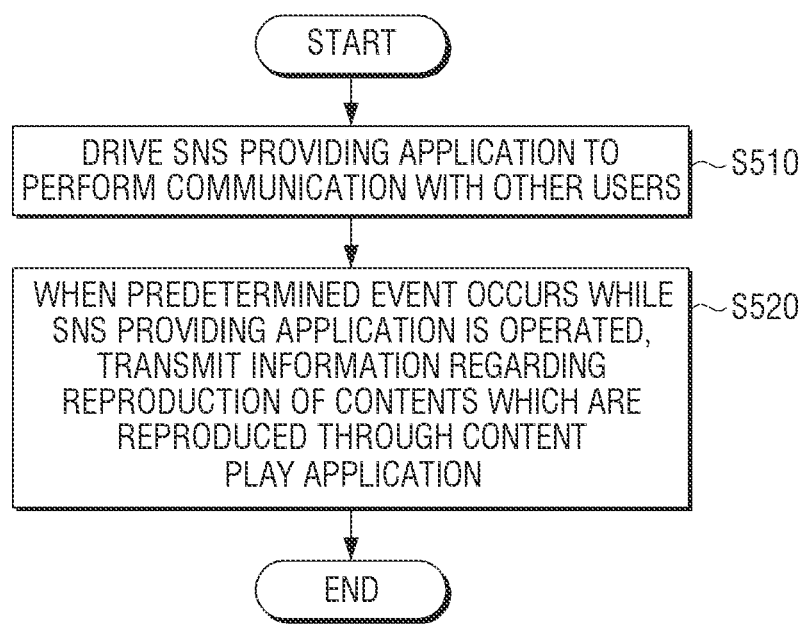
FIG. 8 is a flowchart provided to explain a method for providing contents in a user terminal according to an embodiment of the present disclosure.

FIG. 8 is a flowchart provided to explain a method for providing contents in a user terminal according to an embodiment of the present disclosure.

Referring to FIG. 8, an SNS providing application to perform communication with another user is operated at operation S510.

Subsequently, when a predetermined event occurs while the SNS providing application is operated, information regarding reproduction of contents may be transmitted to the SNS providing server through a content play application at operation S520.

Herein, the predetermined event may include at least when of a point of time when a content play command is input and a point of time when a menu button to share reproduction of contents is selected.

In addition, when the contents are a real-time broadcast, the information regarding reproduction of contents may include information regarding a broadcast channel which is reproduced in a user terminal device, and when the contents are streaming contents, the information regarding reproduction of contents may include a network address which may receive streaming of contents and information on the time when a predetermined event occurs.

Figure 9:
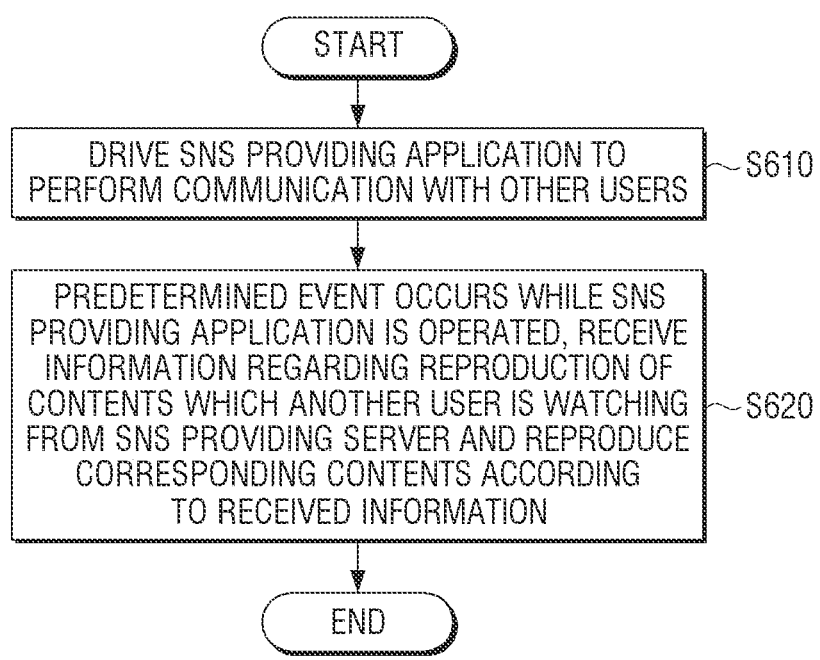
FIG. 9 is a flowchart provided to explain a method for providing contents in a user terminal according to an embodiment of the present disclosure.

FIG. 9 is a flowchart provided to explain a method for providing contents in a user terminal according to an embodiment of the present disclosure.

Referring to FIG. 9, an SNS providing application to perform communication with another user is operated at operation S610.

Subsequently, when a predetermined event occurs while the SNS providing application is operated, information regarding reproduction of contents that another user is watching is received from an SNS providing server, and the corresponding contents are reproduced according to the received information at operation S620.

Herein, the predetermined event may be a point of time when a user command to receive information regarding reproduction of contents that another user is watching from the SNS providing server.

In addition, when the contents are a real-time broadcast, the information regarding reproduction of contents may include information regarding a broadcast channel which is reproduced in a user terminal device, and when the contents are streaming contents, the information regarding reproduction of contents may include a network address which may receive streaming of contents and information on the time when the contents are reproduced.

In this case, a content play application may be operated according a control command received from the SNS providing server in operation S620, and the same broadcast as the real-time time broad cast that another user is watching may be provided based on information regarding the broadcast channel.

In addition, a content play application may be operated according to a control command received from the SNS providing server in S620, and the streaming contents at the same reproduction time as the streaming contents that another user is watching may be provided based on the network address and the time information.

Figure 10:
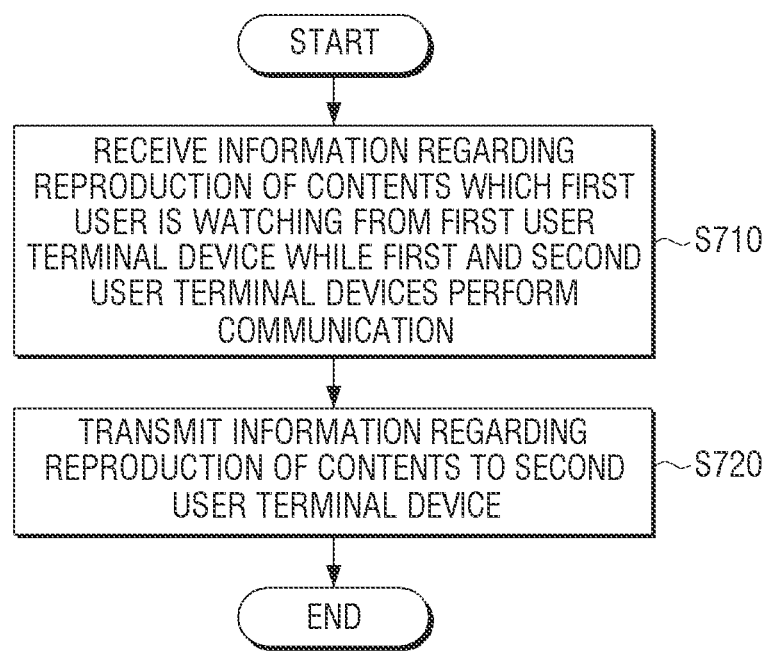
FIG. 10 is a flowchart provided to explain a method for providing contents in an SNS providing server according to an embodiment of the present disclosure.

FIG. 10 is a flowchart provided to explain a method for providing contents in an SNS providing server according to an embodiment of the present disclosure. The SNS providing server may perform communication with the first and the second user terminal devices.

Referring to FIG. 10, information regarding reproduction of contents that the first user is watching is received from the first user terminal while the first and the second user terminal devices perform communication with each other at operation S710.

Subsequently, information regarding reproduction of contents is transmitted to the second user terminal at operation S720. In this case, a control command to drive a content play application corresponding to the information regarding reproduction of contents may be transmitted to the second user terminal device.

In addition, a non-transitory computer readable medium which stores a program performing content providing methods sequentially according to an embodiment of the present disclosure may be provided.

The non-transitory recordable medium refers to a medium which may store data semi-permanently rather than storing data for a short time such as a register, a cache, and a memory and may be readable by an apparatus. For example, the above-mentioned various applications or programs may be stored in a non-temporal recordable medium such as a Compact Disc (CD), a Digital Versatile Disc (DVD), a hard disk, a Blu-ray disc, a USB, memory card, and a ROM and provided therein.

In addition, although a bus is not shown in the above block diagrams, communication between each element of a user terminal may be performed through a bus. In addition, a user terminal may further comprise processors such as CPU, microprocessor, etc. which performs the above-described various operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A user terminal device comprising:
a display;
a transceiver configured to transmit and receive data with a social network service (SNS) providing server; and
at least one processor configured to:
   reproduce a content on the display,
   in response to an SNS providing application being executed while the content is reproduced on the display, display an SNS application screen with the content on the display,
   in response to an SNS message being transmitted to the SNS providing server or an SNS message being received from the SNS providing server, control the display to display the SNS message on the SNS application screen, and
   when a predetermined event occurs while the SNS message is displayed on the display, control to transmit information regarding reproduction of the content being reproduced to the SNS providing server and control the display to display a message for sharing the content with another user terminal device on the SNS application screen while the content is reproduced on the display,
wherein the information regarding the reproduction of the content comprises information on a point in time at which a content play command for reproducing the content is input in the user terminal device.

2. The user terminal device of claim 1, wherein the predetermined event includes at least one of input of the content play command or selection of a menu button to share reproduction of the content.

3. The user terminal device of claim 1,
wherein when the content comprises a real-time broadcast, the information regarding the reproduction of the content includes information regarding a broadcast channel which is reproduced in the user terminal device, and
wherein when the content comprises streaming content, the information regarding the reproduction of the content includes a network address capable of receiving streaming of the content and information on a time when the predetermined event occurs.

4. A user terminal device comprising:
a display;
a transceiver configured to transmit and receive data with a social network service (SNS) providing server; and
at least one processor configured to:
   in response to an SNS providing application being executed, display an SNS application screen on the display,
   in response to an SNS message being transmitted to the SNS providing server or an SNS message being received from the SNS providing server, control the display to display the SNS message on the SNS application screen,
   when a predetermined event occurs while the SNS message is displayed on the display, control the display to display a message for sharing a content being reproduced in another user terminal device,
   in response to a user command to select the message for sharing the content being received, receive, from the SNS providing server, information regarding reproduction of a content being reproduced in the other user terminal device, wherein the information comprises information on a point in time at which a content play command for reproducing the content is input in the other user terminal device, and
   reproduce the content from a same reproduction time as the content being reproduced in the other user terminal device based on the information regarding the reproduction of the content.

5. The user terminal device of claim 4, further comprising:
a user interface configured to receive a user command,
wherein the predetermined event includes an input of a user command to receive the information regarding the reproduction of the content.

6. The user terminal device of claim 4,
wherein when the content comprises a real-time broadcast, the information regarding the reproduction of the content includes information regarding a broadcast channel which is reproduced in the user terminal device, and
wherein when the content comprises streaming content, the information regarding the reproduction of the content includes a network address capable of receiving streaming of the content and information on a time when the content is reproduced.

7. The user terminal device of claim 6, wherein the at least one processor is further configured to:
control a content play application according to a control command received from the SNS providing server, and
provide a same broadcast as a real-time broadcast which the other user terminal device has selected based on the information regarding the broadcast channel.

8. The user terminal device of claim 6, wherein the at least one processor is further configured to:

control a content play application according to a control command received from the SNS providing server, and
provide streaming content at a same reproduction time as streaming content which the other user terminal device has selected based on the network address and the time information.

9. A social network service (SNS) providing server, the server comprising:
a transceiver configured to transmit and receive data with a first and a second user terminal devices; and
at least one processor configured to:
while a SNS providing application is executed in the first and the second user terminal devices, in response to an SNS message being received from the first user terminal device, transmit the SNS message to the second user terminal device and in response to an SNS message being received from the second user terminal device, transmit the SNS message to the first user terminal device,
when a predetermined event occurs while the SNS message is transmitted at least one of the first and the second user terminal devices, receive information regarding reproduction of a content being reproduced in the first user terminal device and transmit a message for sharing the content with the first user terminal device to the second user terminal device, wherein the information comprises information on a point in time at which a content play command for reproducing the content is input in the first user terminal device, and
in response to a user command to select the message for sharing the content being received from the second user terminal device, transmit the information to the second user terminal device so that the second user terminal device reproduces the content from a same reproduction time as the content being reproduced in the first user terminal device based on the information regarding the reproduction of the content.

10. The server of claim 9, wherein the at least one processor is further configured to transmit a control command to control a content play application corresponding to the information regarding the reproduction of the content to the second user terminal device.

11. A method for providing a content in a user terminal device, the method comprising:
reproducing the content on a display of the user terminal device;
in response to a social network service (SNS) providing application being executed while the content is being reproduced on the display, displaying an SNS application screen with the content on the display; communication with another user terminal device;
in response to an SNS message being transmitted to an SNS providing server or an SNS message being received from the SNS providing server, displaying the SNS message on the SNS application screen; and
transmitting, when a predetermined event occurs while the SNS message is displayed on the display, information regarding reproduction of the content being reproduced to the SNS providing server and displaying a message for sharing the content with another user terminal device on the SNS application screen while the content is being reproduced on the display,
wherein the information regarding the reproduction of the content comprises information on a point in time at which a content play command for reproducing the content is input in the user terminal device.

12. The method of claim 11, wherein the predetermined event includes at least one of an input of a content play command or selection of a menu button to share reproduction of the content.

13. The method of claim 11,
wherein, when the content comprises a real-time broadcast, the information regarding the reproduction of the content includes information regarding a broadcast channel which is reproduced in the user terminal device, and
wherein, when the content comprises streaming content, the information regarding the reproduction of the content includes a network address capable of receiving streaming of the content and information on a time when the predetermined event occurs.

14. A method for providing a content in a user terminal device, the method comprising:
in response to a social network service (SNS) providing application being executed, displaying an SNS application screen on a display of the user terminal device;
in response to an SNS message being transmitted to an SNS providing server or an SNS message being received from the SNS providing server, displaying the SNS message on the SNS application screen;
displaying, when a predetermined event occurs while the SNS message is displayed on the display a message for sharing a content being reproduced in another user terminal device;
in response to a user command to select the message for sharing the content being received, receiving, from the SNS providing server,
information regarding reproduction of the content being reproduced in the other user terminal device,
wherein the information comprises information on a point in time at which a content play command for reproducing the content is input in the other user terminal device; and
reproducing the content from a same reproduction time as the content being reproduced in the other user terminal device based on the information regarding the reproduction of the content.

15. A method for providing a content in a social network service (SNS) providing server which performs communication with a first and a second user terminal devices, the method comprising:
while an SNS providing application is executed in the first and the second user terminal devices, in response to an SNS message being received from the first user terminal device, transmitting the SNS message to the second user terminal device and in response to an SNS message being received from the second user terminal device, transmitting the SNS message to the first user terminal device;
when a predetermined event occurs while the SNS message is transmitted to at least one of the first and the second user terminal devices, receiving information regarding reproduction of a content being reproduced in the first user terminal device and transmitting a message for sharing the content with the first user terminal device to the second user terminal device, wherein the information comprises information on a point in time at which a content play command for reproducing the content is input in the first user terminal device; and
in response to a user command to select the message for sharing the content being received from the second user terminal device, transmitting the information to the second user terminal device so that the second user terminal device reproduces the content from a same reproduction time as the content being reproduced.

* * * * *